(12) United States Patent
Shapira et al.

(10) Patent No.: US 9,965,506 B2
(45) Date of Patent: *May 8, 2018

(54) TECHNIQUES FOR REFORMULATING SEARCH QUERIES

(71) Applicant: Samsung Electronics Co., Ltd., Suwon-si, Gyeonggi-do (KR)

(72) Inventors: Liron Shapira, Mountain View, CA (US); Jonathan Ben-Tzur, Sunnyvale, CA (US); Michael Harris, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/237,584

(22) Filed: Aug. 15, 2016

(65) Prior Publication Data

US 2016/0350366 A1 Dec. 1, 2016

Related U.S. Application Data

(63) Continuation of application No. 14/099,832, filed on Dec. 6, 2013, now Pat. No. 9,418,103.

(51) Int. Cl.
*G06F 17/30* (2006.01)
(52) U.S. Cl.
CPC .. *G06F 17/30395* (2013.01); *G06F 17/30365* (2013.01); *G06F 17/30477* (2013.01)
(58) Field of Classification Search
None
See application file for complete search history.

(56) References Cited

U.S. PATENT DOCUMENTS

| | | |
|---|---|---|
| 6,094,652 A | 7/2000 | Faisal |
| 7,996,419 B2 | 8/2011 | Pfleger |
| 2005/0222976 A1 | 10/2005 | Pfleger |
| 2006/0106896 A1 | 5/2006 | Carlson et al. |
| 2007/0027866 A1 | 2/2007 | Schmidt-Karaca |
| 2007/0038601 A1 | 2/2007 | Guha |
| 2007/0219982 A1 | 9/2007 | Piper et al. |
| 2008/0288965 A1 | 11/2008 | Grechanik et al. |
| 2010/0306191 A1 | 12/2010 | LeBeau et al. |
| 2012/0166411 A1* | 6/2012 | MacLaurin ....... G06F 17/30864 707/706 |

(Continued)

OTHER PUBLICATIONS

PCT International Search Report and Written Opinion, PCT Application No. PCT/US2014/068466, dated Mar. 2, 2015, 14 pages.

(Continued)

*Primary Examiner* — Syed H Hasan
(74) *Attorney, Agent, or Firm* — Jefferson IP Law, LLP

(57) ABSTRACT

A method includes receiving a first search query from a user device. The method includes identifying, by a computer search system and using the first search query, an entity type indicating a category for at least a portion of the first search query. The method includes generating, by the computer search system, a second search query including the entity type identified using the first search query. The method also includes performing, by the computer search system, a search for software applications using the second search query. The method further includes generating a list of software applications identified during the search.

14 Claims, 19 Drawing Sheets

(56) References Cited

U.S. PATENT DOCUMENTS

| | | | |
|---|---|---|---|
| 2012/0233140 A1 | 9/2012 | Collins-Thompson et al. | |
| 2013/0110766 A1* | 5/2013 | Promhouse | G06F 9/466 707/607 |
| 2013/0124493 A1* | 5/2013 | Lang | G06F 17/30861 707/706 |
| 2013/0238594 A1 | 9/2013 | Hong et al. | |
| 2013/0290319 A1 | 10/2013 | Glover et al. | |
| 2014/0188862 A1* | 7/2014 | Campbell | G06F 17/30554 707/728 |
| 2014/0214898 A1 | 7/2014 | Shapira et al. | |

OTHER PUBLICATIONS

Bernard J. Jansen et al.: "Patterns of Query Reformulation During Web Searching", Journal of the American Society for Information Society and Technology; Jul. 1, 2009.

Claudio Carpineto et al.: "A Survey of Automatic Query Expansion in Information Retrieval", ACM Computing Surveys, vol. 44, No. 1, Jan. 1, 2012.

European Search Report for Application No. 14867709.9 dated May 30, 2017.

First Chinese Office Action dated Apr. 27, 2017 from Chinese Application No. 201480075035X. Translation provided.

Frank, Blair Hanley, "Microsoft fires back at Google with Bing contextual search on Android," PCWorld from IDG, https://www.pcworld.com/article/2974042/android/microsoft-fires-back-at-google-with-bing-contextual-search-on-android.html; Aug. 20, 2015.

Yahoo Search API; ProgrammableWeb, https://www.programmableweb.com/api/yahoo-search; accessed Nov. 10, 2017.

Yahoo Web Services Blog, "Y!Q Contextual Search API Available" https://developer.yahoo.com/blogs/ydn/y-q-contextual-search-api-available-7065.html; Mar. 16, 2005.

Bing, "Bing snapshots on Android available on tap", YouTube video: https://www.youtube.com/watch?v=384xrKf6s98, Publisehed Aug. 20, 2015.

\* cited by examiner

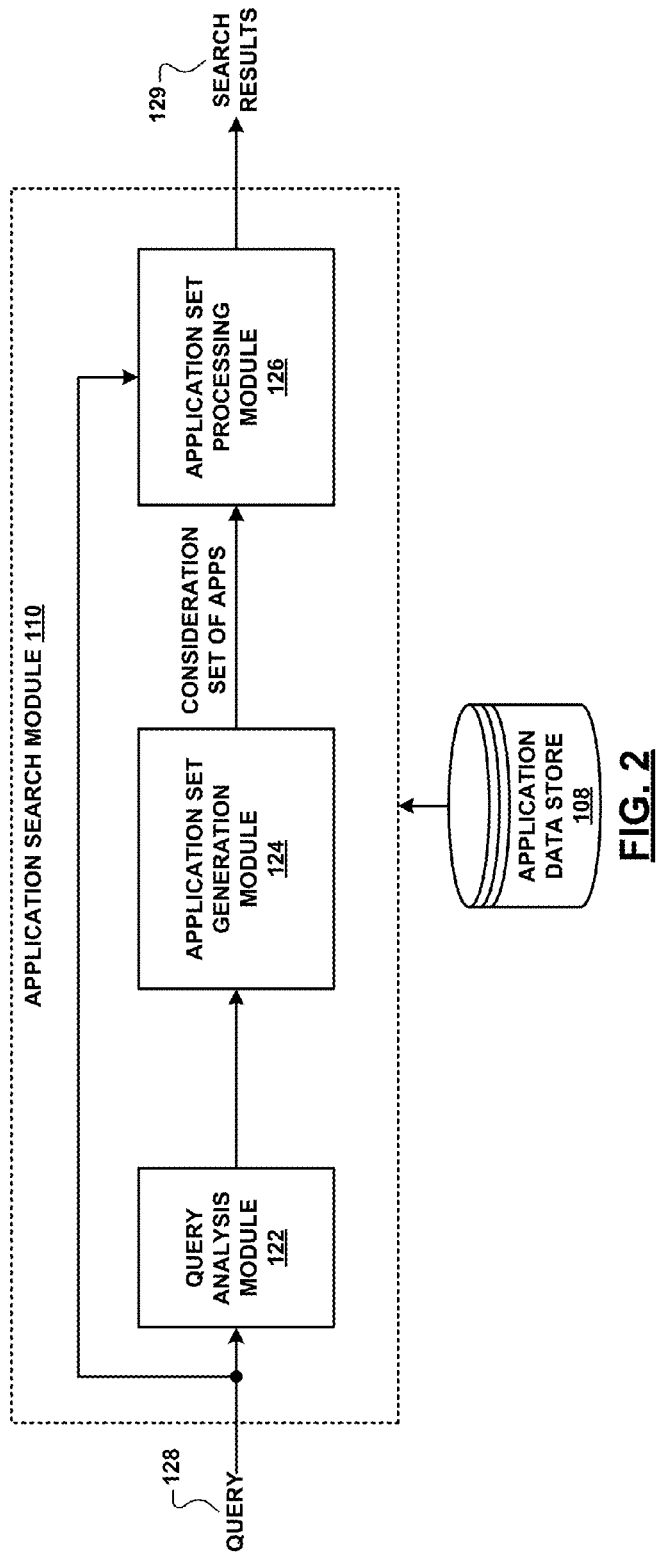
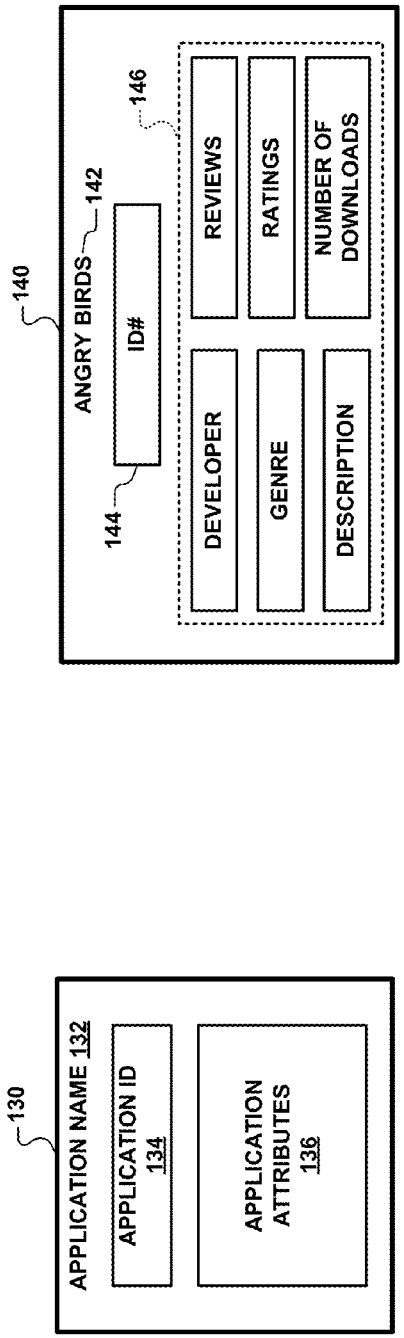

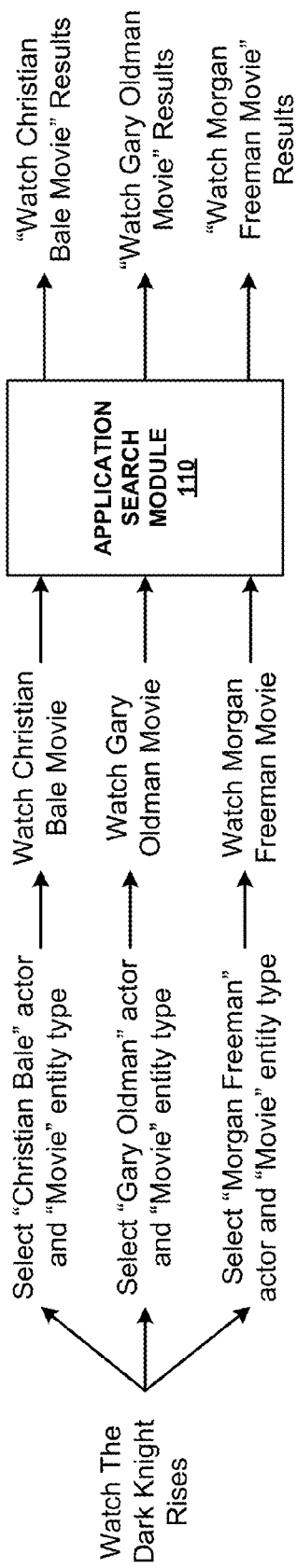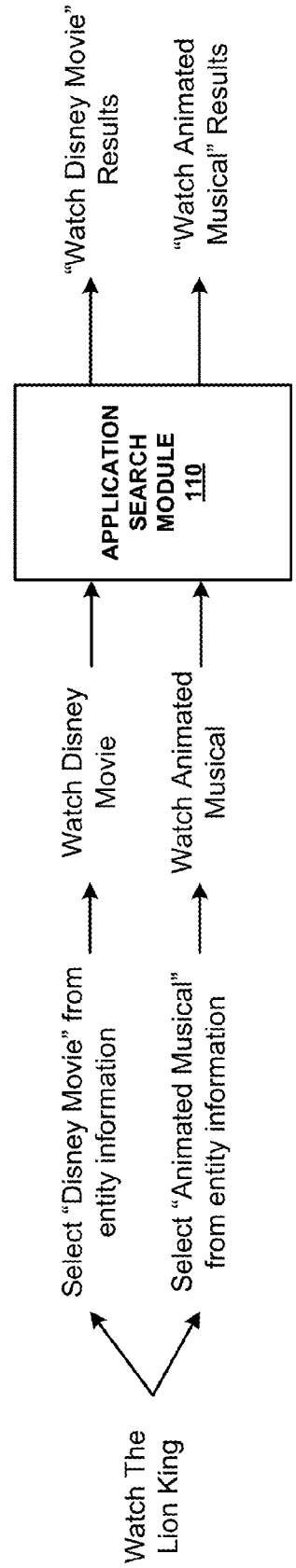
FIG. 13B
FIG. 13C

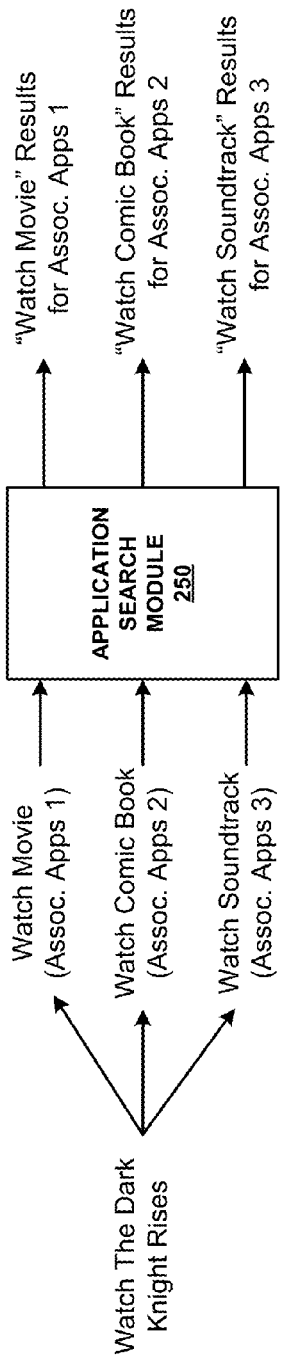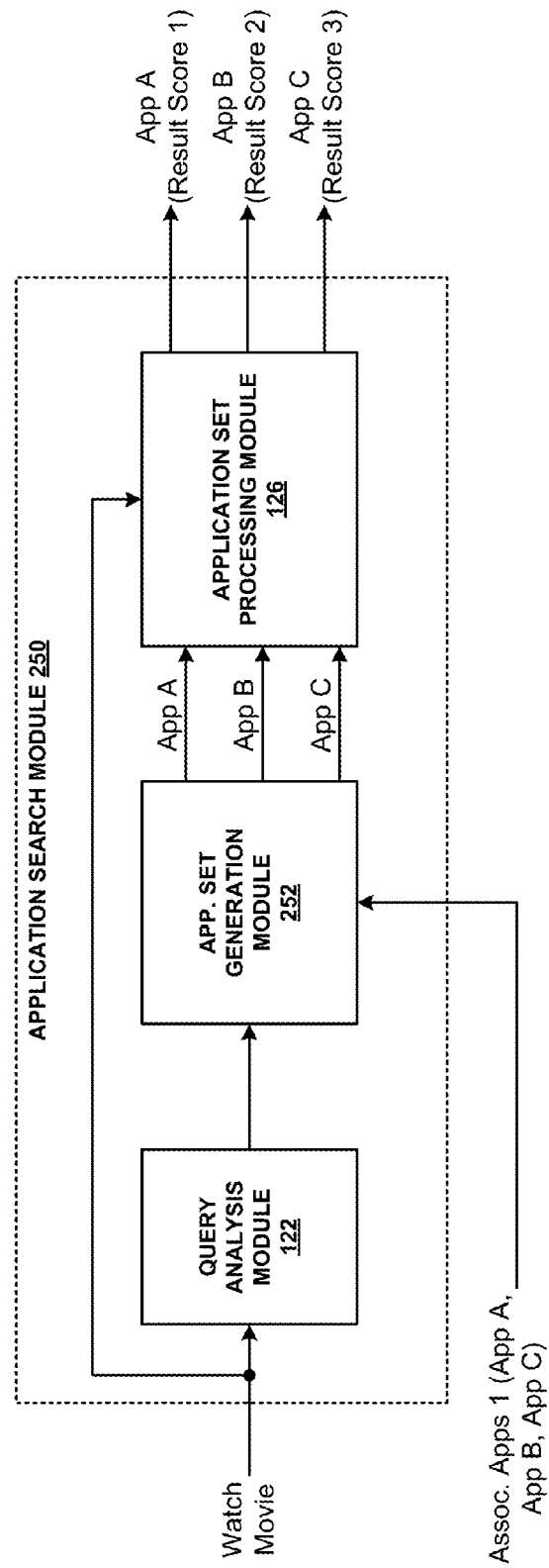

TECHNIQUES FOR REFORMULATING SEARCH QUERIES

CROSS-REFERENCE TO RELATED APPLICATIONS

The present application is a continuation of U.S. patent application Ser. No. 14/099,832 filed on Dec. 6, 2013, now U.S. Pat. No. 9,418,103. The entire disclosure of the application referenced above is incorporated by reference.

FIELD

The disclosure generally relates to the field of search, and more particularly to techniques for reformulating search queries.

BACKGROUND

In recent years, use of computers, smartphones, and other Internet-connected devices has grown exponentially. Correspondingly, the number of available software applications for such devices has also grown. Today, many diverse applications can be accessed on any number of different devices, including, but not limited to, smartphones, personal computers, automobiles, and televisions. These diverse applications can range from business driven applications, games, educational applications, news applications, shopping applications, messaging applications, media streaming applications, social networking applications, and so much more. Furthermore, application developers develop vast amounts of applications within each genre and each application may have numerous editions.

When searching for applications, users may enter search queries that reference an entity. For example, a user may enter a search query that specifies a user's functional desire along with a reference to an entity. An example of such a search query may be "watch the lion king" A search based on keywords included in the search query may fail to capture the user's desire for a video-viewing application that can display the movie named "The Lion King".

SUMMARY

A method includes receiving a search query and identifying an entity record in an entity data store using the search query. The entity data store includes a plurality of entity records. Each of the entity records includes an entity name, an entity type, and entity information. The entity type indicates a category in which the entity name and the entity information belongs. The method further includes generating a reformulated query by inserting one or more terms from the identified entity record into the search query. Additionally, the method includes performing a search for software applications using the reformulated query and generating a list of software applications identified during the search.

BRIEF DESCRIPTION OF THE DRAWINGS

The details of one or more examples are set forth in the accompanying drawings and the description below. Other features, objects, and advantages will be apparent from the description and drawings, and from the claims.

FIG. 2 shows an example application search module.

FIGS. 3A-3B show example application records.

FIGS. 13A-13C are diagrams that show the generation of reformulated queries using terms from entity information of an identified entity record.

FIGS. 18A-18B are diagrams that show how search results may be limited by a list of associated applications.

DETAILED DESCRIPTION

Figure 1:
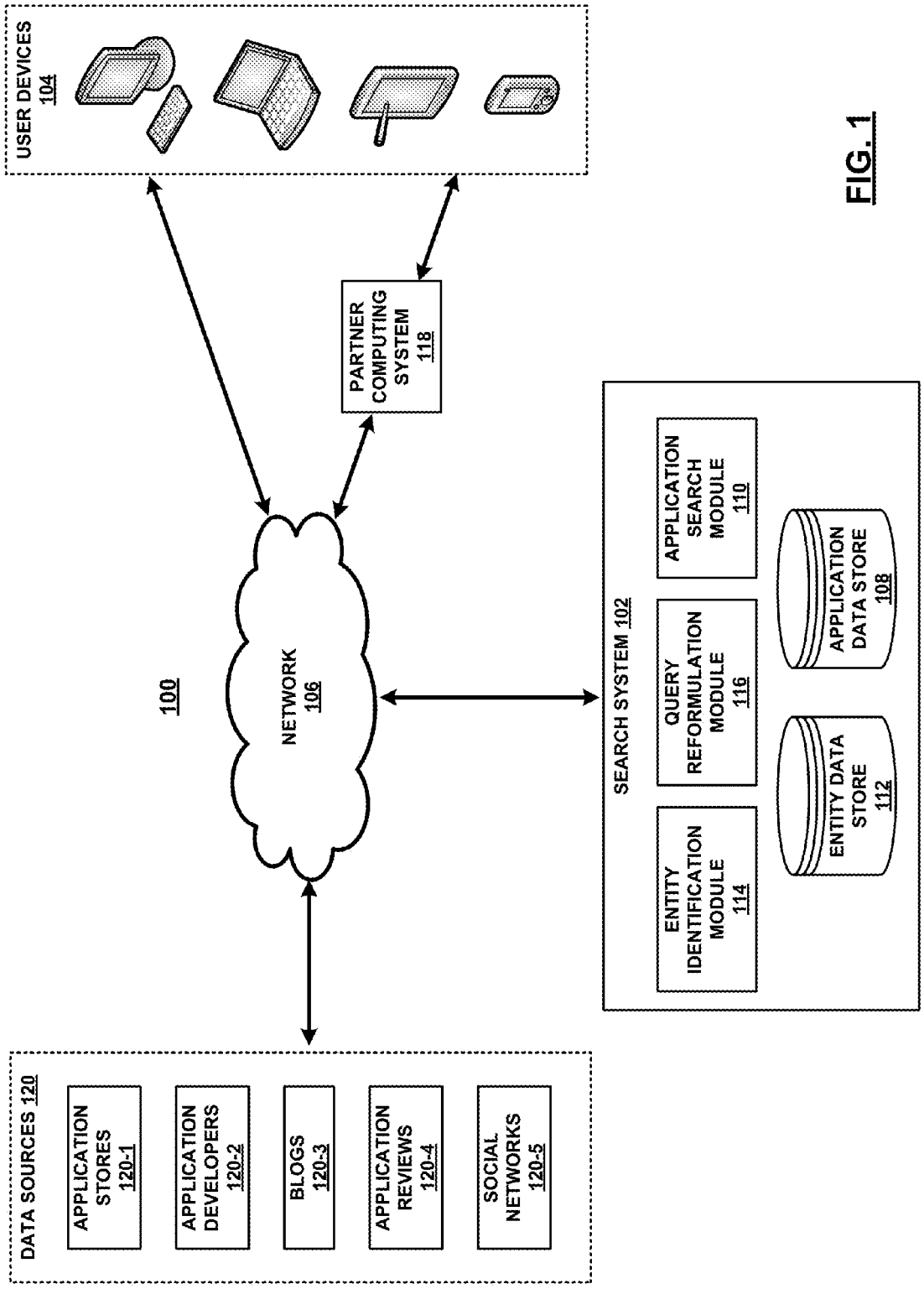
FIG. 1 shows an example environment including a search system configured to support software application searches.

The figures and the following description relate to example implementations by way of illustration only. It should be noted that from the following discussion, alternative implementations of the structures and methods disclosed herein will be readily recognized as viable alternatives that may be employed without departing from the scope of the disclosure.

The present disclosure relates to searches for software applications (hereinafter "applications"). A search system of the present disclosure receives a search query from a user's computing device (e.g., a mobile computing device). The search system generates search results in response to the received search query. The search results include a list of applications, which may be ranked based on a variety of different factors (e.g., relevance). In some implementations, the search system transmits the search results in the form of a list of applications to the user's computing device. The user's computing device displays the list of applications to the user so that the user may select one of the applications to preview and/or download. Although the search system transmits the list of search results to the user's computing device in some implementations, in other implementations the search system uses the search results in a different manner. In one example, the search system uses the search results to generate advertisements for the user. The search system may select which of the search results to transmit in some examples. For example, the search system may only transmit the highest ranked search result to the user.

The search system includes an application data store and an entity data store which the search system may use to generate the search results. In one implementation, the search system receives a search query and generates one or more reformulated search queries which may be used to generate the search results. A reformulated query may be a reformulation of the received search query that includes one or more terms taken from the entity data store and inserted into the received search query. The search system may search the application data store using each of the reformulated queries. The search system may then generate search results for each of the reformulated queries and/or the received search query. The search results may be transmitted to a user's computing device for display on the user's computing device.

The application data store includes data associated with a plurality of different applications. The application data store may include one or more databases, indices (e.g., inverted indices), files, or other data structures storing this data. The data in the application data store may include application statistics (e.g., a number of downloads), keywords associated with applications, reviews associated with applications, the name of the developer of the application, the platform of the application, the price of the application, a category of the application, and other information. The application data store may include data for a variety of different applications available on a variety of different operating systems. The search system may retrieve and analyze data from the application data store in order to provide search results.

The entity data store includes data associated with a plurality of different entities. The entity data store may include one or more databases, indices (e.g., inverted indices), files, or other data structures storing this data. The entity data store of the present disclosure includes a plurality of entity records. Each entity record includes data associated with a different entity. For example, an entity record may include data that is descriptive of an entity. The term "entity" may generally refer to a noun (e.g., a person, animal, place, thing, or idea). Examples of entities may include, but are not limited to, the movie named "The Lion King", the soundtrack named "The Lion King", the song named "Hey Jude", and the book named "The Hobbit". Although an entity may generally refer to a noun, it is contemplated that an entity may include other parts of speech (e.g., verbs, adjectives, etc.).

An entity record may be a data structure that includes an entity name, an entity type, and entity information. An entity name may include one or more words, numbers, and/or symbols (e.g., punctuation marks). In some examples, the entity name may refer to a noun which denotes a person, animal, place, thing, or idea. In one example, the entity name of the entity record for The Lion King movie may be "The Lion King". In another example, the entity name of the song Hey Jude may be "Hey Jude". Although entity names may refer to a noun, it is contemplated that entity names may also refer to other parts of speech, such as verbs, pronouns, adjectives, etc.

Each entity record may include an entity type that may indicate a category in which the entity name and the entity information belongs. Put another way, the entity type may indicate a category in which the data of the entity record belongs. An entity type may include one or more words, numbers, and/or symbols (e.g., punctuation marks). An entity type may be a noun in some examples. Example entity types include, but are not limited to, a movie entity type, a music entity type, a book entity type, and a game entity type. In one example, an entity record having the entity name "The Lion King" may have an entity type "movie". In this example, the entity type "movie" indicates that the entity record named "The Lion King" relates to a movie. In another example, an entity record having the entity name "The Lion King Soundtrack" may have an entity type "music". In this example, the entity type "music" indicates that the entity record named "The Lion King Soundtrack" relates to music.

Each entity record may include entity information. Entity information may refer to data included in the entity record in addition to the entity name and the entity type. Entity information may include various types of data. For example, entity information may include structured, semi-structured, and/or unstructured data. Examples of different types of data which may be included in entity information is described below.

Structured data in the entity information of an entity record may include data that is associated with a defined data field. In some implementations, the defined data fields may be tailored to the entity type of the entity record. For example, entity information for an entity record having a movie entity type may include data fields for actor(s), director(s), and producer(s). As another example, entity information for an entity record having a music type may include data fields for an artist's name, track names, and track lengths. As another example, entity information for an entity record having a book type may include data fields for an author's name, a publisher, and a publication date.

Unstructured data in the entity information of an entity record may include data that is not specifically associated with a defined data field. Instead, unstructured data may be in free form, such as text from websites, review articles, wiki articles, or other sources. For example, entity information for a movie entity type may include unstructured data, such as critic reviews and plot summaries. As another example, entity information for a book entity type may include unstructured data, such as book synopses, book reviews, and passages from the book.

Semi-structured data in the entity information of an entity record may refer to data that at a broad level is associated with a data field, but the data within the data field is provided in an unstructured manner. For example, data in the entity information may be broadly associated with a description data field, but text associated with the description data field may be considered unstructured at a more granular level. In the example of a book entity, semi-structured data may include a synopsis of a book chapter in a data field for chapter 1 of the book. In the example of a movie entity, semi-structured data may include movie review text in a data field for movie reviews.

In some implementations, an entity record may also include an entity identifier (hereinafter "entity ID") that identifies the entity record amongst the other entity records included in the entity data store. For example, the entity ID may uniquely identify the entity record. The entity ID may be a string of alphabetic, numeric, and/or symbolic characters (e.g., punctuation marks) that uniquely identify the entity record in which the entity ID is included. In implementations of the entity data store where different entity records have the same entity name, the entity ID and/or the entity type may be used to differentiate the entity records. For example, the entity name "Beethoven" could be associated with a variety of different entity records such as an entity record having a music entity type, an entity record having a biographic book entity type, and an entity record having a movie entity type. Though otherwise similar in name, the entity ID permits differentiation between these "Beethoven" entity records.

As described above, the search system may generate one or more reformulated queries using a received search query. In general, the search system may generate a reformulated query using the received search query and one or more terms from an entity record included in the entity data store. In one example, the search system may insert one or more words from an entity record into the received search query in order to generate a reformulated query. In another example, the search system may replace one or more words from the received search query with one or more words retrieved from an entity record. The search system may perform one or more searches for applications in the application data store using the one or more reformulated queries.

Using the search query, the search system may identify one or more entity records related to terms of the search query. The identified entity records may be used to generate one or more reformulated queries. The search system may identify entity records in a variety of different ways. In general, the search system may identify an entity record by detecting matches, or near matches, between terms of the received search query and terms included in the entity record. In one example, the search system may identify an entity record by detecting matches, or near matches, between terms of the received search query and a name of the entity record. In another example, the search system may identify an entity record by detecting matches, or near matches, between terms of the received search query and terms in the entity information of the entity record. Identification of entity records and generation of reformulated queries using terms from the identified entity records is now described.

In some implementations, the search system may identify an entity record by identifying an entity name in the received search query. For example, the search system may determine that an entity name matches, or is similar to, one or more terms in the search query. In this example, the search system may identify the entity type of the identified entity record. The search system may then insert the identified entity type into the received search query to generate a reformulated query. For example, the search system may generate a reformulated query by replacing the terms of the received search query that are similar to the entity name with the entity type. A search based on a reformulated query using the entity type instead of the entity name may help provide more relevant search results to the user in some examples. A reformulated query including an entity type may be a more generalized search query that captures a wider variety of applications relative to the search query entered by the user. The variety of applications resulting from the more generalized search query may include relevant applications that otherwise may not have been found using a more specific query having an entity name.

Examples of inserting an entity type into a received search query are now described. In an example where the received search query is "Watch Citizen Kane", the search system may identify an entity record including the entity name "Citizen Kane" and the entity type "movie". The search system may then insert the entity type "movie" into the received search query in place of the words "Citizen Kane" to yield the reformulated query "Watch movie". The search system may then perform a search of the application data store using the query "Watch movie". The reformulated query "Watch movie" may capture the user's broader search intentions better than the original search query "Watch Citizen Kane". For example, if the user intended to find movie playing applications, the reformulated query "Watch movie" may yield search results that are more directed to movie playing applications than a search including the words "Citizen Kane".

The search system may identify multiple entity records in response to the received search query, for example where multiple entity records include the same entity name. For example, if the received search query is "Read Pride and Prejudice", the search system may identify multiple entity records such as a Pride and Prejudice movie and a Pride and Prejudice book. In this example, the search system may generate a reformulated query for each of the identified entity records. Specifically, the search system may generate the reformulated queries of "Read movie" and "Read book". In some examples, the less relevant results yielded for the reformulated query "Read movie" may be filtered out from the search results transmitted to the user. Although the search system is described above as generating one or two reformulated queries, the search system may generate any number of reformulated queries based on the number of identified entity records.

In some examples, the search system may generate a reformulated query by inserting one or more terms from entity information into the received search query. In these examples, the search system may identify an entity record based on a match, or near match, with an entity name. The search system may then insert one or more terms from the entity information into the received search query to generate the reformulated query. Such a reformulated query may yield additional search results that are aligned with different aspects of the user's interests. In one example, if the identified entity record is a movie, the search system may generate one or more reformulated queries including actors' names. In this case, if a user is interested in certain actors in the movie, the reformulated query may yield additional search results related to the actors for the user to consider. Thus, more than one reformulated search query may be generated for each identified entity record.

In some implementations, the search system may identify an entity record by detecting terms in the entity information of the entity record that are included in the search query. For example, the search system may identify an entity record when the entity information of the entity record includes similar words as the received search query. In this example, the search system may identify the entity type and/or entity name of the identified entity record. The search system may then insert the identified entity type and/or entity name into the received search query to generate a reformulated query. For example, the search system may generate a reformulated query by replacing words of the received search query with the identified entity type and/or entity name. As described above, a reformulated query including an entity type may be a more generalized search query that captures a wider variety of results (e.g., applications) during searching.

A reformulated query generated using the entity name of the identified entity record may provide a more focused search in some examples. For example, if a search query "Listen to Sopranos theme song" is received, the search system may identify an entity record for the song "Woke Up This Morning" based on words included in the entity information of the entity record for the song "Woke Up This Morning". The search system may then generate a reformulated query "Listen to Woke Up This Morning", which may be a more focused search than the general search query "Listen to Sopranos theme song". As another example, if a search query "Watch cartoon movies for kids" is received, the search system may identify an entity record for "The Lion King" movie based on words included in the entity information of the entity record for "The Lion King". The search system may then generate a reformulated query "Watch The Lion King", which may be a more focused search than the general search query "Watch cartoon movies for kids".

In other implementations, the search system may identify an entity record by detecting a first set of terms in the entity information of the entity record that are included in the search query, then generate a reformulated query using a second set of terms from the entity information of the identified entity record. For example, the search system may identify the entity record for "The Lion King" movie (e.g., movie entity type) based on a search query "Watch cartoon movies for kids". The search system may then generate reformulated queries by inserting voice actors' names into the received search query. Example reformulated queries may include "Watch Matthew Broderick movie" and "Watch James Earl Jones movie". As described above, such reformulated queries may yield additional search results that are aligned with different aspects of the user's interests. In another example, the search system may generate reformulated queries by inserting other entity information into the search query. For example, the search system may insert the production company of "The Lion King" into the search query to generate the reformulated query "Watch Disney Movie". As another example, the search system may insert a description of "The Lion King" into the search query, such as the terms "animated musical". In this example, the search system may generate the reformulated query "Watch animated musical".

The search system may be configured to reformulate search queries using any of the techniques described above. For example, the search system may use one or more of the reformulation techniques described above to generate one or more reformulated queries based on a single received search query. The search system may also perform a search for the received search query along with searches performed for the reformulated queries. In some scenarios, the search system may not identify an entity record in the entity data store based on the received search query. For example, some search queries may not include words that sufficiently match entity records included in the entity data store. In these examples, the search system may refrain from generating reformulated queries. Instead, the search system may perform an application search using the received query.

As described above, the search system may generate a set of search results that includes a list of applications and result scores associated with the applications. The search system may rank the list of applications according to the result scores associated with the applications. In some implementations, a higher result score associated with an application may indicate that the application is more relevant to the search query than if the application had a lower result score. In some examples, a result score may be a value from 0.0 to 1.0, where a result score of 1.0 indicates that the application is highly relevant to the search query.

The search system may generate the result scores in a variety of different ways. In some examples, the search system may generate the result scores based on entity-related values that may be included in entity records and/or determined after receiving the search query. In some implementations of the search system in which entity-related values are used, applications may be assigned an initial score based on a variety of different factors. As described herein, the initial score may be based on features associated with the query and/or applications. The initial score may then be weighted by one or more entity-related values to generate the result score for the application. For example, the initial score for an application may be multiplied by entity-related values to generate the result score. Two example entity-related values described herein are entity quality scores and query-entity alignment scores. Weighting search results using entity quality scores and query-entity alignment scores is described herein with reference to FIGS. 15A-17.

An entity quality score may be included in an entity record along with other data in the entity record, such as the entity name, entity type, and entity information. The entity quality score may be a number used by the search system to weight an initial score of an application. An entity quality score may indicate the relative popularity of an entity in some examples. In these examples, an entity quality score may be assigned to an entity record based on the popularity of the entity described by the entity record. For example, if two entity records are related to movies, the more popular movie (e.g., more downloaded movie) may include a larger entity quality score. In one sense, the entity quality score may implement the notion that, all else being equal, a user would probably prefer to see search results for a more popular entity rather than a less popular entity. In a more quantitative sense, the entity quality score may represent the probability that a random user's search query is meant to reference the entity associated with the entity record.

An entity quality score may be used by the search system in the following manner. Initially, the search system may generate a reformulated query using an entity record. The search system may then perform a search using the reformulated query. The search yields an initial score for each application resulting from the search. Next, the search system may weight the initial scores of the applications by the entity quality score of the entity record used to generate the reformulated query used in the search. In one example, the search system may multiply the initial scores of the applications by the entity quality score to generate the result scores for the applications. In this example, a larger entity quality score may tend to produce larger result scores.

A query-entity alignment score is another entity-related value which may be used to weight initial scores associated with applications. A query-entity alignment score may indicate how well the received query matches with the entity record identified based on the received query. For example, the query-entity alignment score may be based on how well the text of the received search query matches the text of the identified entity record. The query-entity alignment score may be greater in cases where the text of the received search query closely matches the text of the entity record (e.g., the entity name). The search system may determine the query-entity alignment score associated with identified entity records after initially identifying the entity records. The search system may weight the initial scores of the applications by the query-alignment scores. For example, the search system may multiply the initial scores of the applications by the query-entity alignment scores.

In some implementations, the search system may use the entity-related values to reduce the number of searches performed. Reducing the number of searches performed may reduce the overall computing resources used to deliver search results to a user. In one example, the search system may discard (e.g., ignore) identified entity records if the identified entity records have low entity quality scores. For example, the search system may refrain from generating reformulated queries using identified entity records having quality scores that are less than a threshold value. Similarly, the search system may discard identified entity records if the identified entity records are associated with low query-entity alignment scores.

As described herein, the application system may discard identified entity records using other filtering techniques in order to reduce the overall computing resources used to perform a search. In some examples, the search system may discard identified entity records that have entity names which are substrings of the entity names of other identified entity records. For example, if a search query includes the entity name "The Dark Knight Rises" and the search system identifies entity records for "The Dark Knight Rises" and "The Dark Knight", the search system may discard the entity record for "The Dark Knight" using techniques disclosed herein.

In some implementations of the search system, entity records may include a list of associated applications along with the entity name, entity type, and entity information. The list of associated applications included in an entity record may be a list of applications that are related to the entity record in some way. Since entity records in the entity data store describe different entities, each of the entity records may have a different list of associated applications. Put another way, the associations between applications and entity records may be on a per entity record basis.

There are a variety of different reasons for which applications may be associated with an entity record. In some examples, the associated applications may process the entity type as input. For example, if an entity record has a movie entity type, the entity record may include movie playing applications in the list of associated applications. Similarly, a list of associated applications in an entity record having a music entity type may include music playing applications. Since entity records in the entity data store describe different entities, it is contemplated that entity records having the same entity type may have different lists of associated applications. For example, different entity records having a movie entity type may have different lists of movie playing applications and movie database applications. Similarly, different entity records having a music entity type may have different associated music player applications.

The list of associated applications may be used as a filter to reduce the total number of applications which are scored by the search system. For example, the search system may limit application scoring to those applications listed in the identified entity records. The search system may use a list of associated applications within an entity record in the following manner. Initially, the search system may determine which applications are associated with an identified entity record by looking at the list of associated applications included in the identified entity record. The search system may then generate a reformulated query using the identified entity record. Typically, without a list of associated applications, the search system searches the application data store to determine a consideration set of applications to score at a later time. When the identified entity record includes a list of associated applications, the search system may bypass the step of searching the application data store and move directly to scoring the applications included in the list of applications. By doing so, the number of applications scored may be reduced, which may reduce the computational resources used to generate search results. Although using a list of associated applications may help reduce the computational resources used to generate search results, the list of associated applications may also help provide relevant search results because those applications listed in the list of associated applications may have been determined to be relevant to the entity record upon which the search results are based.

As described above, the search system may perform a search for each of the reformulated queries. Each search performed using a reformulated query may return a set of search results. Since the search system may perform a search for each of the reformulated queries, the application search may return multiple sets of search results. The search system may also return a set of search results for the received query. In some implementations, the search system may combine the search results generated in response to each of the reformulated queries and the received search query into one combined set of search results. For example, the search system may remove duplicate search results and rank all of the generated search results as one combined set of search results. The combined set of search results may then be transmitted to the user device that generated the search query.

Figure 4:
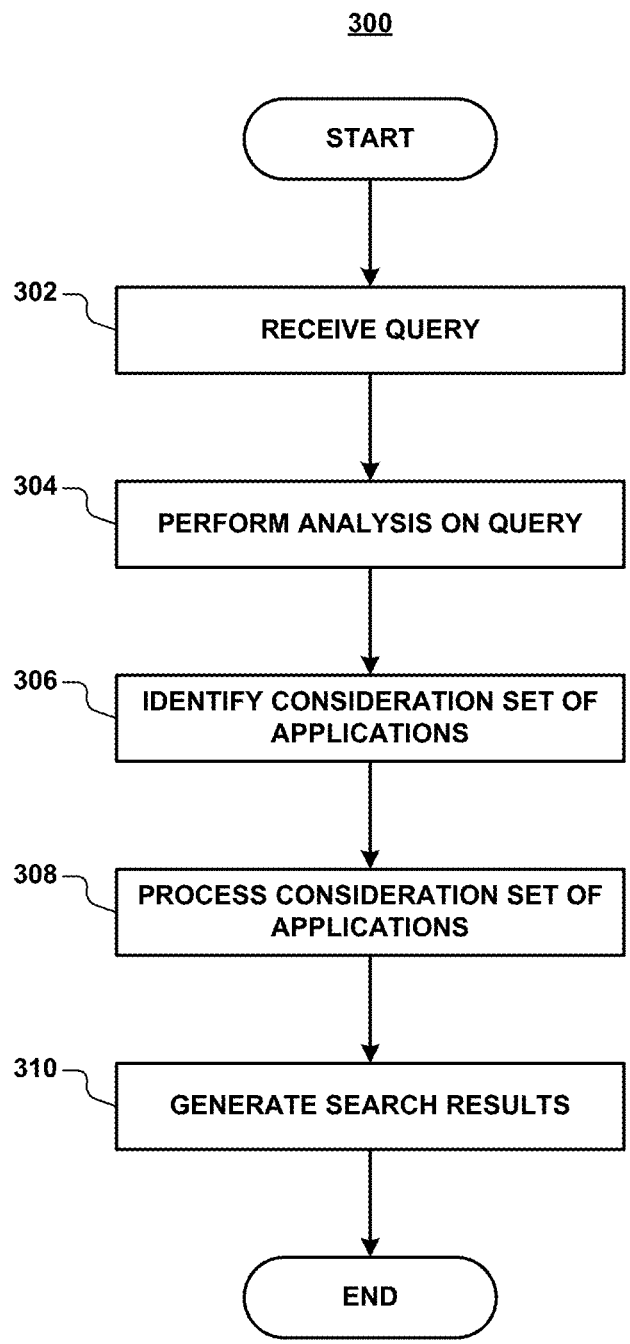
FIG. 4 shows an example method for performing a search based on a received query.

Techniques for performing searches are described hereinafter with reference to FIGS. 1-19. FIG. 1 shows an example environment including a search system according to the present disclosure. FIGS. 2-4 show techniques for searching an application data store. FIGS. 5-14 show techniques for generating reformulated queries for use in searching the application data store. FIG. 15A and FIGS. 16A-17 show techniques for using entity-related values for weighting result scores. FIGS. 15B-15C and FIGS. 18A-19 show techniques for using a list of associated applications in an entity record.

FIG. 1 is a functional block diagram illustrating an example environment 100 including a search system 102 configured to perform searches for software applications. A software application may refer to computer software that causes a computing device to perform a task. In some examples, a software application may be referred to as an "application", an "app", or a "program". Example applications include, but are not limited to, word processing applications, spreadsheet applications, messaging applications, media streaming applications, social networking applications, and games.

Applications can be executed on a variety of different computing devices. For example, applications can be executed on mobile computing devices such as smart phones, tablets, and wearable computing devices (e.g., headsets and/or watches). Applications can also be executed on other types of computing devices having other form factors such as laptop computers, desktop computers, or other consumer electronic devices. In some examples, applications may be installed on a computing device prior to a user purchasing the computing device. In other examples, the user may download and install applications on the computing device.

The functionality of an application may be accessed on the computing device on which the application is installed. Additionally, or alternatively, the functionality of an application may be accessed via a remote computing device. In some examples, all of an application's functionality is included on the computing device on which the application is installed. These applications may function without communication with other computing devices (e.g., via the Internet). In other examples, an application installed on a computing device may access information from other remote computing devices during operation. For example, a weather application installed on a computing device may access the latest weather information via the Internet and display the accessed weather information to the user through the installed weather application. In still other examples, an application (e.g., a web based application) may be partially executed by the user's computing device and partially executed by a remote computing device. For example, a web application may be an application that is executed, at least in part, by a web server and accessed by a web browser of the user's computing device. Example web applications may include, but are not limited to, web-based email, online auctions, and online retail sites.

The search system 102 is configured to receive search queries from one or more user device(s) 104 via a network 106. The search system 102 performs a search for applications in response to a received search query. The search may generate a set of search results that includes a list of applications, each of which is associated with a result score that indicates the rank of the application relative to the other applications in the list. The search system 102 may then transmit the search results to the user device that transmitted the search query.

A user device 104 may display the search results to the user and allow the user to select one of the applications in the list in order to view information related to the application and/or download the application. The applications (e.g., the executable programs) listed in the search results sent to the user may be accessible from (e.g., downloaded from) systems different than the search system 102 in some examples. Put another way, the search system 102 may store data related to applications that are accessible in locations other than the search system 102. For example, the applications may be accessible from digital distribution platforms configured to distribute the applications. Example digital distribution platforms include, but are not limited to, Google Play developed by Google Inc., the App Store developed by Apple Inc., and Windows Phone Store developed by Microsoft Corporation. Although the applications listed in the search results may be accessed in locations other than the search system 102, the search system 102 may include applications for download in some implementations.

The search system 102 includes an application data store 108 and an application search module 110. The application data store 108 includes a variety of different types of data related to different applications. The application data store 108 may include one or more databases, indices (e.g., inverted indices), files, or other data structures which may be used to implement the techniques of the present disclosure. As described herein, the data included in the application data store 108 may include descriptions of applications, statistics related to applications (e.g., download numbers, review numbers, etc.), and other information. As described hereinafter, the application search module 110 receives a query (e.g., a reformulated query and/or a user search query) and generates search results based on the data included in the application data store 108.

The search system 102 includes an entity data store 112, an entity identification module 114, and a query reformulation module 116. The entity data store 112 includes a plurality of entity records (e.g., entity record 152 of FIG. 6A). The entity identification module 114 receives a search query (e.g., from a user device 104). The entity identification module 114 identifies one or more entity records included in the entity data store 112 based on the received search query. For example, the entity identification module 114 may identify an entity record by detecting matches, or near matches, between terms of the received search query and terms included in the entity record (e.g., the entity name, entity type, and/or entity information). A term may include one or more words, numbers, and/or symbols. Accordingly, the entity identification module 114 may identify an entity record by detecting matches, or near matches, between words, numbers, and/or symbols included in the received search query and the entity record.

The query reformulation module 116 generates one or more reformulated queries using terms from the one or more identified entity records. For example, the query reformulation module 116 may insert words from the one or more identified entity records into the received search query to generate the one or more reformulated queries. The application search module 110 receives the one or more reformulated queries generated by the query reformulation module 116. The application search module 110 may perform searches using each of the reformulated queries received from the query reformulation module 116. The application search module 110 may also perform a search using the original search query received from a user device 104. The application search module 110 may generate search results that are based on each of the searches performed.

The search system 102 may implement various weighting and filtering techniques. In some implementations of the search system 102, the search system 102 may associate one or more weighting values with a reformulated query (e.g., an entity quality score and/or query-entity alignment score). In these implementations, the search system 102 may generate result scores for applications based on the weighting values. In some implementations of the search system 102, entity records may include lists of associated applications. In these implementations, the search system 102 may limit search results to those applications associated with the entity records used to generate the reformulated queries. Various weighting and filtering techniques are described herein with respect to FIGS. 15A-19.

The search system 102 may communicate with the user devices 104, a partner computing system 118, and data sources 120 via the network 106. Examples of the user devices 104, the partner computing system 118, the data sources 120, and the network 106 are now described in turn.

Example environment 100 illustrated in FIG. 1 includes a plurality of user devices 104. An individual user device may also be referred to herein as a user device 104. User devices 104 can be any computing devices that are capable of providing search queries to the search system 102. User devices 104 include, but are not limited to, smart phones, tablet computers, laptop computers, and desktop computers, as illustrated in FIG. 1. User devices 104 may also include other computing devices having other form factors, such as computing devices included in vehicles, gaming devices, televisions, or other appliances (e.g., networked refrigerators).

The user devices 104 may use a variety of different operating systems. In an example where a user device 104 is a mobile device, the user device 104 may run an operating system including, but not limited to, Android, iOS developed by Apple Inc., or Windows Phone developed by Microsoft Corporation. In an example where a user device 104 is a laptop or desktop device, the user device 104 may run an operating system including, but not limited to, Microsoft Windows, Mac OS, or Linux. User devices 104 may also access the search system 102 while running operating systems other than those operating systems described above, whether presently available or developed in the future.

User devices 104 can communicate with the search system 102 via the network 106. In some examples, a user device 104 may communicate with the search system 102 using an application installed on the user device 104. In general, a user device 104 may communicate with the search system 102 using any application that can transmit search queries to the search system 102. In some examples, a user device 104 may run an application that is dedicated to interfacing with the search system 102, such as an application dedicated to application searches. In some examples, a user device 104 may communicate with the search system 102 using a more general application, such as a web-browser application. The application run by a user device 104 to communicate with the search system 102 may display a search field on a graphical user interface (GUI) in which the user may enter search queries. The user may enter a search query using a touchscreen or physical keyboard, a speech-to-text program, or other form of user input.

A search query entered into a GUI on a user device 104 may include words, numbers, and/or symbols. In general, a search query may be a request for information retrieval (e.g., search results) from the search system 102. For example, a search query may be directed to retrieving a list of applications in examples where the search system 102 is configured to generate a list of applications as search results. A search query directed to retrieving a list of applications may indicate a user's desire to retrieve applications that have a functionality described by the search query.

A user device 104 may receive a set of search results from the search system 102 that are responsive to the search query transmitted to the search system 102. The user device 104 may be running an application including a GUI that displays the search results received from the search system 102. For example, the application used to transmit the search query to the search system 102 may also display the received search results to the user. As described above, the application that displays the received search results to the user may be dedicated to interfacing with the search system 102 in some examples. In other examples, the application may be a more general application, such as a web-browser application.

The GUI of the application running on the user device 104 may display the search results to the user in a variety of different ways, depending on what information is transmitted to the user device 104. In examples where the search results include a list of ranked applications, the search system 102 may transmit the list of applications to the user device 104. In this example, the GUI may display the search results to the user as a list of application names. In some examples, the search system 102, or other computing system, may transmit additional information to the user device 104 including, but not limited to, application ratings, application download numbers, application screenshots, and application descriptions. This additional information may be stored in the application data store 108 and transmitted by the search system 102 to the user device 104 in some examples. In examples where the user device 104 receives this additional information, the GUI may display this information along with the list of application names. In some examples, the GUI may display the search results as a list of applications ordered from the top of the screen to the bottom of the screen by descending result score. In some examples, the search results may be displayed under the search field in which the user entered the search query.

In some examples, user devices 104 may communicate with the search system 102 via the partner computing system 118. The partner computing system 118 may represent a computing system of a third party that may leverage the search functionality of the search system 102. The partner computing system 118 may belong to a company or organization other than that which operates the search system 102. Example third parties which may leverage the functionality of the search system 102 may include, but are not limited to, internet search providers and wireless communications service providers. The user devices 104 may send search queries to the search system 102 via the partner computing system 118. The user devices 104 may also receive search results from the search system 102 via the partner computing system 118. The partner computing system 118 may provide a user interface to the user devices 104 in some examples and/or modify the search experience provided on the user devices 104.

FIG. 1 shows a plurality of data sources 120-1, 120-2, . . . , 120-5 (collectively "data sources 120"). The data sources 120 may be sources of data which the search system 102 may use to generate and update the application data store 108 and the entity data store 112. For example, the search system 102 may generate new application records (e.g., application record 130 of FIG. 3A) and update existing application records based on data retrieved from the data sources 120. The search system 102 may also generate new entity records (e.g., entity record 152 of FIG. 6A) and update existing entity records based on data retrieved from the data sources 120. Although not illustrated in FIG. 1, the search system 102 may include modules that generate new records and update existing records based on the data retrieved from data sources 120.

The data sources 120 may include a variety of different data providers. The data sources 120 may include operators of digital distribution platforms (i.e., Application Stores 120-1) configured to distribute applications to user devices 104. Example digital distribution platforms include, but are not limited to, Google Play, the App Store, and Windows Phone Store. The data sources 120 may also include data from application developers 120-2, such as application developers' websites. The data sources 120 may also include data from other websites, such as websites that include web logs 120-3 (i.e., blogs), application review websites 120-4, or other websites including data related to applications. Additionally, the data sources 120 may include social networking sites 120-5, such as "Facebook" (e.g., Facebook posts) and "Twitter" (e.g., text from tweets). Data sources 120 may also include additional types of data sources in addition to data sources 120-1, 120-2, . . . , 120-5 described above. Different data sources may have their own content and update rate.

The search system 102 retrieves data from one or more of the data sources 120. The data retrieved from various data sources 120 can include any type of data related to applications. Examples of data related to applications include, but are not limited to, a name of an application, a description of an application, a substantive review of an application, a quality rating of an application, a developer name, an excerpt from a blog post about an application, a tweet about an application, and one or more images (e.g., icons and/or screenshots) associated with the application. The data related to applications may also include, but is not limited to, statistical data, such as numbers of downloads, download rates (e.g., downloads per month), number of reviews, and the number of ratings. In some examples, data retrieved from the data sources 120 may include information regarding the functionalities of applications.

The search system 102 is configured to generate and update the data in the application data store 108 based on the data retrieved from the data sources 120. For example, the search system 102 may use the retrieved data to update one or more databases, indices, files, or other data structures included in the application data store 108. As described herein, the application data store 108 may include a plurality of application records. The search system 102 may generate new application records and update existing application records based on the data retrieved from the data sources 120. In some examples, some data included in the application data store 108 may be manually generated.

The search system 102 retrieves entity data from various data sources 120. The entity data retrieved from various data sources 120 can include any type of data related to entity records described herein. For example, the entity data may include any data related to an entity name, an entity type, entity information, an entity quality score, and a list of associated applications. Example data included in an entity record is described in greater detail with respect to FIGS. 6A-6C and 15A-15C.

The search system 102 is configured to generate and update the entity data store 112 based on data retrieved from the data sources 120. For example, the search system 102 may use the retrieved data to update one or more databases, indices, files, or other data structures included in the entity data store 112. The search system 102 may generate new entity records and update existing entity records based on the data retrieved from the data sources 120. In some examples, some data included in the entity data store 112 may be manually generated.

As described above, the user devices 104, the search system 102, and the data sources 120 may be in communication with one another via the network 106. The network 106 may include various types of networks, such as a wide area network (WAN) and/or the Internet. Although the network 106 may represent a long range network (e.g., Internet or WAN), in some implementations, the network 106 may include a shorter range network, such as a local area network (LAN). In one embodiment, the network 106 uses standard communications technologies and/or protocols. Thus, the network 106 can include links using technologies such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 106 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other examples, the network 106 can use custom and/or dedicated data communications technologies instead of, or in addition to, the ones described above.

FIG. 2 shows an example application search module 110 which may be included in the search system 102. The application search module 110 includes a query analysis module 122, an application set generation module 124 (hereinafter "set generation module 124"), and an application set processing module 126 (hereinafter "set processing module 126"). The query analysis module 122 analyzes a received query 128 (e.g., a reformulated query). The set generation module 124 identifies a set of applications (e.g., application records) based on the received query 128. The identified set of applications may be referred to herein as a "consideration set". The set processing module 126 processes (e.g., scores) the consideration set to generate a set of search results 129 that may include a list of applications along with corresponding result scores indicating the relative rank of each application in the list.

As described above, the application data store 108 includes data related to a plurality of different applications. The data associated with an application may be referred to herein as an "application record" (e.g., application record 130 of FIG. 3A). Accordingly, the application data store 108 may include a plurality of different application records that each include data related to a different application.

Referring now to FIG. 3A, an example application record 130 includes an application name 132, an application identifier 134, and application attributes 136. The application record 130 may generally represent data stored in the application data store 108 that is related to an application. The application data store 108 includes data related to a plurality of different applications. Accordingly, the application data store 108 may include a plurality of application records having a similar structure as the application record 130. Put another way, the application data store 108 may include a plurality of application records having an application name 132, the application identifier 134, and application attributes 136.

The application name 132 may be the name of the application represented by the data in the application record 130. Example application names may include "Google Maps", "Facebook", "Twitter", "Microsoft Word", or "Angry Birds". The application identifier 134 (hereinafter "application ID 134") identifies the application record 130 amongst the other application records included in the application data store 108. For example, the application ID 134 may uniquely identify the application record 130. The application ID 134 may be a string of alphabetic, numeric, and/or symbolic characters (e.g., punctuation marks) that uniquely identify the application record 130 in which the application ID 134 is included.

The application attributes 136 may include any type of data which may be associated with the application represented by the application record 130. The application attributes 136 may include a variety of different types of data. For example, the application attributes 136 may include structured, semi-structured, and/or unstructured data. The application attributes 136 may include information that is extracted or inferred from documents retrieved from the data sources 120. In some examples, the application attributes 136 may include data that is manually generated. The application attributes 136 may be updated so that up to date results can be provided in response to a user search query.

The application attributes 136 may include the name of the developer of the application, the publisher of the application, a category (e.g., genre) of the application, a description of the application (e.g., a developer's description), a version of the application, the operating system for the application, and the price of the application. The application attributes 136 may also indicate security or privacy data about the application, battery usage of the application, and bandwidth usage of the application.

The application attributes 136 may include application statistics. Application statistics may refer to numerical data related to the application. For example, application statistics may include, but are not limited to, a number of downloads, a download rate (e.g., downloads per month), a number of ratings, and a number of reviews. The application attributes 136 may also include information retrieved from websites such as reviews associated with the application, articles associated with the application (e.g., wiki articles), or other information. The application attributes 136 may also include digital media related to the application, such as images (e.g., icons and/or screenshots).

FIG. 3B shows an example application record 140 for the application (e.g., game) named "Angry Birds". The application record 140 includes the application name "Angry Birds" indicated at 142. The application record 140 includes an application ID number indicated at 144.

The application record 140 includes application attributes 146. The application attributes 146 include data fields for the name of the developer and the genre of the application. The developer of the application included in the application attributes 146 may be "Rovio Entertainment". The genre of the application may be "games". The application attributes 146 also includes fields for description and reviews. The description may include text that describes "Angry Birds". In some examples, the description may be provided by the developer of the application. The field for reviews may include text from user reviews in some examples.

The application attributes 146 also includes fields for application statistics, such as ratings and the number of downloads. The ratings field may indicate the ratings given to the application by the users. For example, the ratings may include a number of stars (e.g., 0-5 stars) assigned to the application by the users. The number of downloads may indicate the total number of times the application has been downloaded.

FIG. 2 shows an example application search module 110 which is configured to generate a set of search results 129 based on a query 128. The query 128 received by the application search module 110 is the query used to perform an application search on the application data store 108. As described herein, the query 128 may be a reformulated query that is generated based on a received search query sent by a user device 104. Additionally, or alternatively, the query 128 may be a received search query sent by a user device 104.

The query analysis module 122 receives the query 128. The query analysis module 122 may perform various analysis operations on the received query 128. For example, analysis operations performed by the query analysis module 122 may include, but are not limited to, tokenization of the query, filtering of the query, stemming, synonymization, and stop word removal. The application search module 110 may receive a plurality of reformulated queries and/or the search query generated by a user device 104. The query analysis module 122 may analyze each of the plurality of reformulated queries separately (e.g., in series or parallel). Additionally, the query analysis module 122 may analyze the search query generated by the user device 104.

The set generation module 124 identifies a set of applications (i.e., the consideration set) based on the query 128. In some examples, the set generation module 124 may identify the set of applications by identifying application records based on matches between terms of the query 128 and terms in the application records. For example, the set generation module 124 may identify a set of applications in the application data store 108 based on matches between tokens generated by the query analysis module 122 and words included in the application records. The consideration set of applications may be a list of application records in some examples. For example, the consideration set may be a list of application IDs and/or a list of application names.

The set processing module 126 performs a variety of different processing operations on the consideration set to generate a set of search results 129 that includes a list of applications. In some implementations, the set processing module 126 may generate a result score for each of the applications included in the consideration set in order to generate the set of search results 129. In these implementations, the set of search results 129 may include a list of applications (e.g., application IDs and/or application names), each of which is associated with a corresponding result score. In some examples, the search results 129 may include all of the applications from the consideration set. In other examples, the search results 129 may include a subset of the consideration set. For example, the subset may be those applications having the largest result scores.

The information conveyed by the search results 129 may depend on how the result scores are calculated by the set processing module 126. For example, the result scores may indicate the relevance of an application to the search query, the popularity of an application in the marketplace, the quality of an application, or other properties of the application, depending on what parameters the set processing module 126 uses to score the applications.

The set processing module 126 may generate result scores for applications in a variety of different ways. In general, the set processing module 126 may generate a result score for an application based on one or more scoring features. The scoring features may be associated with the application and/or the query 128. An application scoring feature may include any data associated with an application. For example, application scoring features may include any of the application attributes included in the application record or any additional parameters related to the application, such as data indicating the popularity of an application (e.g., number of downloads) and the ratings (e.g., number of stars) associated with an application. A query scoring feature may include any data associated with a query 128. For example, query scoring features may include, but are not limited to, a number of words in the query, the popularity of the query, and the expected frequency of the words in the query. An application-query scoring feature may include any data which may be generated based on data associated with both the application and the query 128 (e.g., the query that resulted in identification of the application record by the set generation module 124). For example, application-query scoring features may include, but are not limited to, parameters that indicate how well the terms of the query match the terms of the identified application record. The set processing module 126 may generate a result score for an application based on at least one of the application scoring features, the query scoring features, and the application-query scoring features.

The set processing module 126 may determine a result score based on one or more of the scoring features listed herein and/or additional scoring features not explicitly listed. In some examples, the set processing module 126 may include one or more machine learned models (e.g., a supervised learning model) configured to receive one or more scoring features. The one or more machine learned models may generate result scores based on at least one of the application scoring features, the query scoring features, and the application-query scoring features. For example, the set processing module 126 may pair the query 128 with each application and calculate a vector of features for each (query, application) pair. The vector of features may include application scoring features, query scoring features, and application-query scoring features. The set processing module 126 may then input the vector of features into a machine-learned regression model to calculate a result score that may be used to rank the application in the search results 129 for the query 128.

The results scores may be used in a variety of different ways. In some examples, the result scores may be used to rank the applications in a list of results that is presented on a user device 104. In these examples, a larger result score may indicate that the application is more relevant to a user than an application having a smaller result score. In examples where the search results 129 are displayed as a list on a user device 104, the applications associated with larger result scores may be listed nearer to the top of the results list (e.g., near to the top of the screen). In these examples, applications having lower result scores may be located farther down the list (e.g., off screen) and may be accessed by a user scrolling down the screen of the user device 104.

In some implementations, the set of search results 129 may be transmitted to a user device 104 that generated the search query upon which the search results 129 are based. As described herein, the search results may be generated by performing searches using the search query received from the user device 104 as well as additional reformulated queries. The search results 129 may be formatted on a user device 104 as a list of applications matching the search query. The search results 129 may include any suitable information corresponding to the various applications. For example, the search results 129 provided by the search system 102 to a user device 104 may be formatted as a list of applications, including, for example, a name of the application, an image associated with the application (e.g., a logo, a screenshot, and/or a video), a link to download the application, a description and rating of the application, and/or other information.

Although the search system 102 may transmit the search results 129 to a user device 104 in some implementations, the search system 102 may use the search results 129 in a different manner in other implementations. For example, the search system 102 may use the search results 129 as a basis for generating advertisements for the user. It is also contemplated that the search system 102 may select which of the search results 129 to transmit to a user device 104 in some examples. For example, the search system 102 may only transmit the highest ranked search result to a user device 104 in some examples.

FIG. 4 shows an example method 300 for performing a search based on a received query. The method 300 is described with reference to the application search module 110 of FIG. 2. In block 302, the query analysis module 122 receives a query 128. In some examples, the query 128 may be a reformulated query generated by the query reformulation module 116 of FIG. 1. In other examples, the query 128 may be a search query that was generated by a user device 104.

In block 304, the query analysis module 122 analyzes the query 128. In block 306, the set generation module 124 identifies a consideration set of applications (e.g., a set of application records) based on the query 128 (e.g., based on output from the query analysis module 122). In block 308, the set processing module 126 processes the consideration set of applications. For example, the set processing module 126 may generate a result score for each of the applications in the consideration set. In block 310, the set processing module 126 generates a set of search results 129. The search results 129 may include a list of applications and associated result scores. The search system 102 may then transmit the search results 129 to a user device 104 in some examples.

The application search module 110 may perform a search using the search query received from a user device 104 and for each of a plurality of reformulated queries (e.g., in series or in parallel). The application search module 110 may perform blocks 304-310 of method 300 for each of the reformulated queries. The application search module 110 may also perform blocks 304-310 of method 300 for the search query received from the user device 104. Accordingly, the application search module 110 may generate multiple sets of search results corresponding to the multiple searches. In some examples, the application search module 110 (e.g., the set processing module 126) may combine the search results from multiple different searches into one set of combined search results that are transmitted to the user device that generated the search query.

Figure 5:
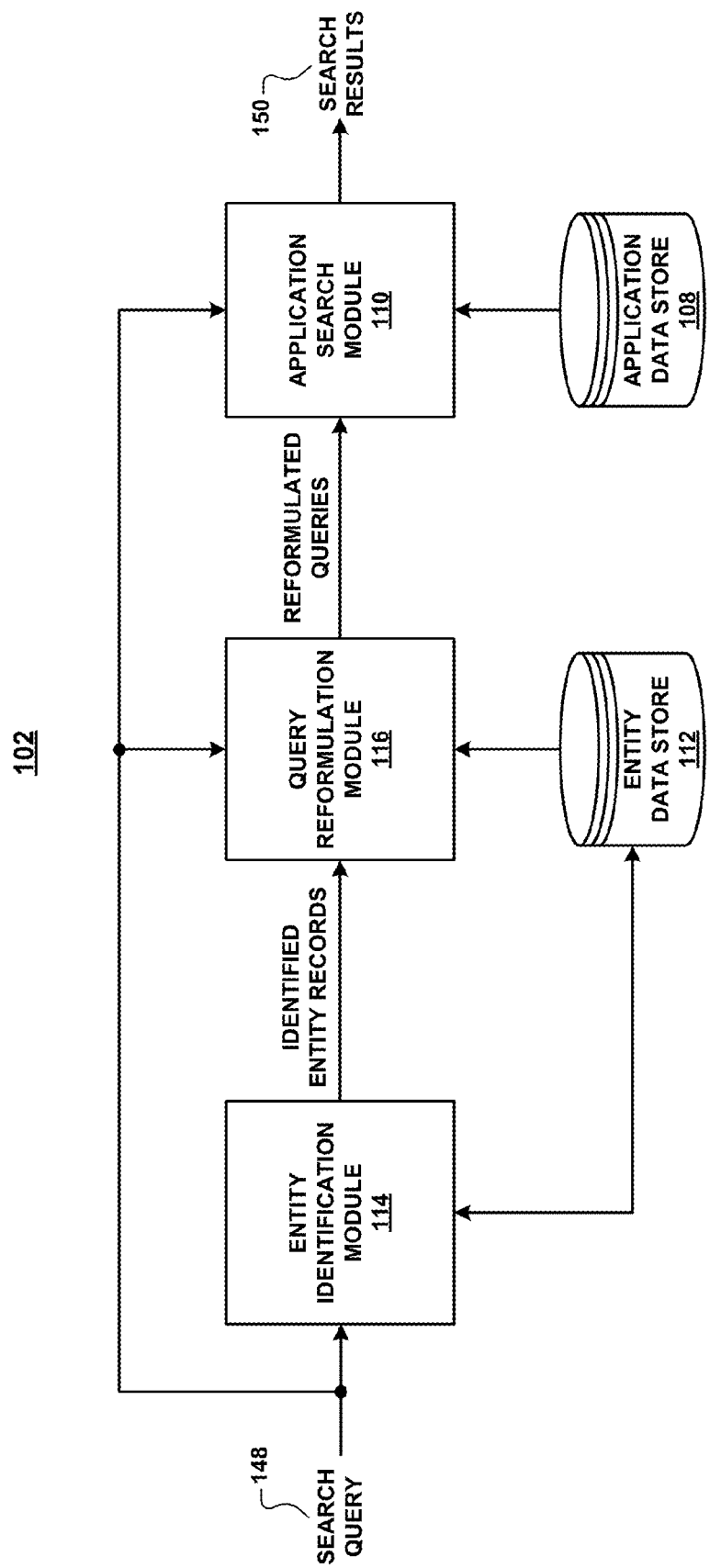
FIG. 5 is a functional block diagram of an example search system that generates search results based on reformulated queries.
Figure 6C:
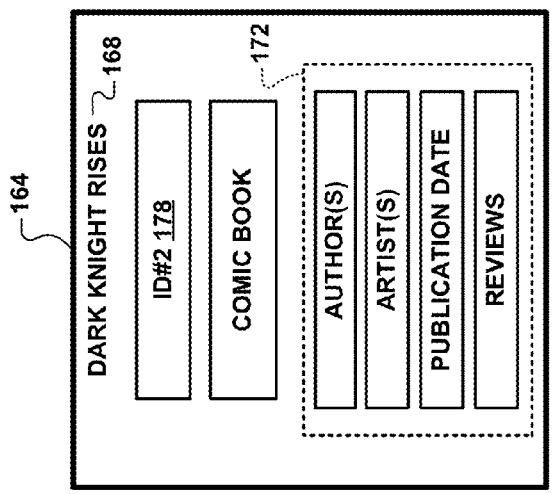
FIGS. 6A-6C show example entity records.
Figure 6B:
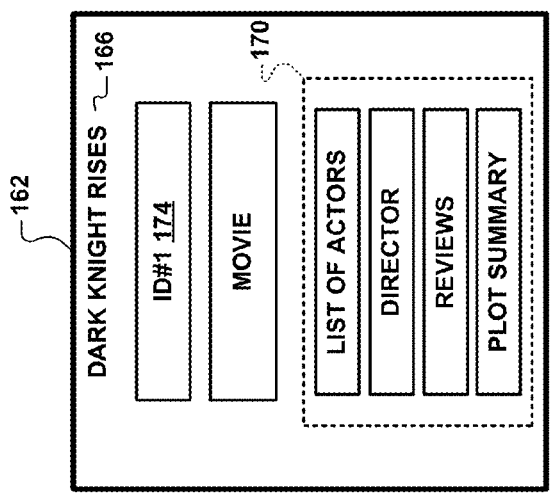
Figure 6A:
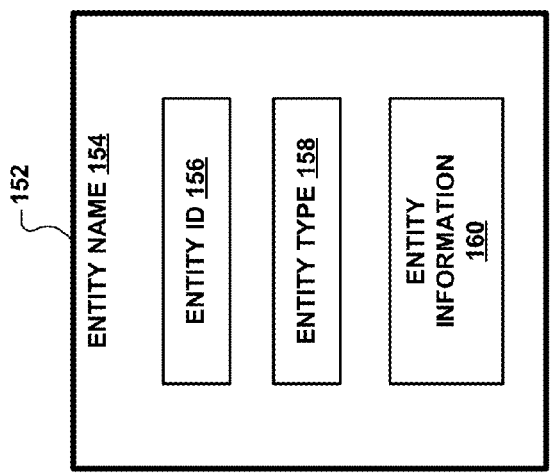
Figure 7:
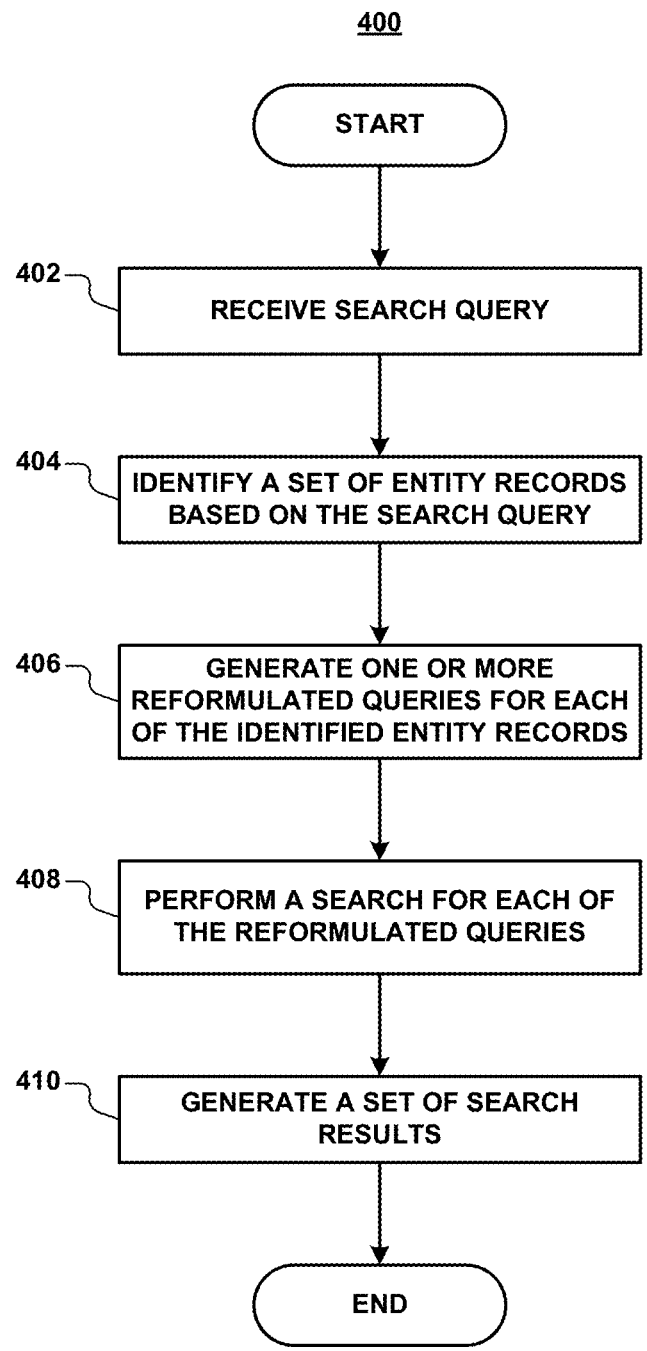
FIG. 7 shows a method for generating search results based on reformulated queries.

FIGS. 5-7 describe the generation of reformulated queries and search results based on the reformulated queries. FIG. 5 is a functional block diagram of an example search system 102 that includes an entity identification module 114, a query reformulation module 116, and an example application search module 110, as described above. The application search module 110 may operate as described above. For example, application search module 110 may generate a set of search results based on a received query. FIGS. 6A-6C show example entity records which may be included in the entity data store 112. FIG. 7 shows a method for generating search results based on the reformulated queries.

Referring now to FIG. 5, the entity identification module 114 receives a search query 148 from a user device 104. The search query 148 may be a query entered by a user on a user device 104. The search query 148 may include text, numbers, and/or symbols (e.g., punctuation) entered into the user device 104 by the user. For example, the user may have entered the search query 148 into a search field (e.g., a search box) of an application running on the user device 104 using a touchscreen keypad, a mechanical keypad, and/or via speech recognition. The search results 150 generated by the search system 102 may be transmitted back to the user device 104 that generated the search query 148.

Although the search system 102 (e.g., the entity identification module 114) is illustrated and described herein as receiving a search query 148 that includes text, it is contemplated that the search system 102 (e.g., the entity identification module 114) may receive additional data along with the search query 148. The search query 148 and the additional data along with the search query 148 may be referred to as a query wrapper. In some examples, the query wrapper may include contextual information associated with the search query 148, such as platform constraint information (e.g., operating system version, device type, browser version), geo-location preferences, partner specific information (e.g., which services are being used to access the search system 102), and other information. A user device 104 may generate and transmit the additional data included in a query wrapper at the time the user device 104 transmits the search query.

The entity identification module 114 identifies one or more entity records in the entity data store 112 in response to receiving the search query 148. The entity identification module 114 may identify entity records in a variety of different ways. In some implementations, the entity identification module 114 may identify an entity record by detecting matches, or near matches, between terms (e.g., one or more words) of the received search query 148 and terms included in the entity record. For example, the entity identification module 114 may identify an entity record by detecting matches between terms of the received search query 148 and terms included in at least one of the entity name, the entity type, and the entity information of the entity record. Various heuristics and other techniques may be applied to further filter and score the identified entity records.

The query reformulation module 116 may use one or more identified entity records to generate one or more reformulated queries. In general, the query reformulation module 116 generates a reformulated query by inserting one or more terms from an identified entity record into the received search query 148. For example, the query reformulation module 116 may insert one or more words from at least one of the entity name, entity type, and entity information into the received search query 148. In some implementations, the query reformulation module 116 may replace one or more words from the received search query 148 with one or more words retrieved from an identified entity record. The application search module 110 may generate search results for each of the reformulated queries.

The entity data store 112 includes a plurality of entity records which may be used by the entity identification module 114 and the query reformulation module 116 to generate reformulated queries. For example, the entity identification module 114 may identify entity records included in the entity data store 112 based on the received search query 148. The query reformulation module 116 may then generate reformulated queries using terms from the identified entity records in the entity data store 112. Example entity records are illustrated and described with respect to FIGS. 6A-6C. Other example entity records are illustrated and described with respect to FIGS. 15A-15C.

FIG. 6A shows an example entity record 152 which may be included in the entity data store 112. The entity record 152 may generally represent data stored in the entity data store 112 that is related to an entity (e.g., a noun). It is contemplated that the data included in the illustrated entity record 152 could be stored and accessed in a variety of different ways. The entity data store 112 includes data related to a plurality of different entities. Accordingly, the entity data store 112 may include a plurality of entity records having a similar structure as the entity record 152. Put another way, the entity data store 112 may include a plurality of entity records having an entity name 154, an entity ID 156, an entity type 158, and entity information 160.

The entity name 154 may include one or more words, numbers, and/or symbols (e.g., punctuation marks). In some examples, the entity name 154 may denote a person, animal, place, thing, or idea. The entity record 152 includes an entity type 158 that indicates a category in which the data of the entity record 152 belongs. For example, the entity type 158 indicates the category in which the entity name 154 and the entity information 160 belong. The entity type 158 may include one or more words, numbers, and/or symbols (e.g., punctuation marks). For example, the entity type 158 may be a noun. The entity record 152 includes an entity identifier 156 (i.e., "entity ID 156"). The entity ID 156 may identify the entity record 152 amongst the other entity records included in the entity data store 112. For example, the entity ID 156 may uniquely identify the entity record 152. The entity ID 156 may be a string of alphabetic, numeric, and/or symbolic characters (e.g., punctuation marks) that uniquely identify the entity record 152.

FIGS. 6B-6C show different example entity records 162, 164. Entity record 162 includes data related to the movie named "The Dark Knight Rises". Entity record 164 includes data related to the comic book named "The Dark Knight Rises". The entity names 166, 168 for the entity records 162, 164 include the names of the movie and the comic book, respectively. In the example entity names 166, 168, the stop word "the" has been removed. The entity type "movie" of entity record 162 indicates the category in which the entity name "Dark Knight Rises" and the entity information 170 belongs. Put another way, the entity type "movie" of the entity record 162 indicates that the entity name 166 and entity information 170 included in the entity record 162 is related to a movie. The entity type "comic book" of entity record 164 indicates the category in which the entity name "Dark Knight Rises" and the entity information 172 belongs. Put another way, the entity type "comic book" of the entity record 164 indicates that the entity name 168 and the entity information 172 included in the entity record 164 is related to a comic book.

The entity records 162, 164 include different entity IDs 174, 178. Specifically, entity records 162, 164 include entity IDs "ID #1" and "ID #2". Entity IDs "ID #1" and "ID #2" represent different entity IDs that may uniquely identify entity records 162, 164, respectively. For example, "ID #1" and "ID #2" may represent different strings of alphabetic, numeric, and/or symbolic characters that uniquely identify entity records 162, 164 in the entity data store 112.

Referring back to FIG. 6A, the entity record 152 includes entity information 160. The entity information 160 represents data in the entity record 152 in addition to the entity name 154 and the entity type 158. In general, the entity information 160 may include any data that is associated with either the entity name 154 or the entity type 158. In some implementations, the data included in the entity information 160 may be data that is associated with both the entity name 154 and the entity type 158. Put another way, the data included in the entity information 160 may be related to the entity name 154 and included in a category described by the entity type 158.

The entity information 160 may include various types of data (e.g., structured, semi-structured, and/or unstructured data). Structured data in the entity information 160 may refer to data included in a defined data field. Semi-structured data in the entity information 160 may refer to data that at a broad level is associated with a data field, but the data within the data field is provided in an unstructured manner. Unstructured data in the entity information 160 may include data that is not specifically associated with a defined data field.

The entity information 160 may include data that is associated with a defined data field. In some examples, the defined data fields may be tailored to the entity type 158 of the entity record 152. For example, entity records having a first entity type may include a first set of data fields associated with the first entity type. Entity records having a second entity type that is different than the first entity type may include a second set of data fields associated with the second entity type that are different than the first set of data fields. In other examples, the entity records included in the entity data store 112 may have similar data fields, even when the entity records include different entity types.

The entity information 160 may include any type of data related to an entity, including, but not limited to, numbers or other statistics related to the entity, names, dates, text from websites, review articles, wiki articles, or other type of data. For example, if the entity type 158 is "movie", then the entity information 160 may include data fields for actor(s), director(s), producer(s), review(s), and plot summaries. As another example, if the entity type 158 is "music", then the entity information 160 may include data fields for an artist's name, track names, and track lengths. As another example, if the entity type 158 is "book", then the entity information 160 may include data fields for an author's name, a publisher, and a publication date.

FIGS. 6B-6C show examples of entity information 170, 172 included in entity records 162, 164. The entity information 170 included in entity record 162 is related to the movie named "The Dark Knight Rises". The entity information 172 included in entity record 164 is related to the comic book named "The Dark Knight Rises". The entity information 170 includes data fields related to a movie, such as a list of actors, a director, reviews, and a plot summary. The entity information 172 includes data fields related to a comic book, such as one or more authors, one or more artists, a publication date, and comic book reviews. The data fields illustrated in the entity information 170, 172 of FIGS. 6B-6C are only example data fields which may be included in entity information. It is contemplated that entity information 170, 172 may include additional data fields not illustrated in FIGS. 6B-6C. In some examples, the entity information 170, 172 may not include some or all of the data fields illustrated in FIGS. 6B-6C.

The different data fields included in the entity information 170, 172 of entity records 162, 164 illustrate how different entity records may include different data fields. The different data fields included in the entity information 170, 172 of entity records 162, 164 also illustrate how the data fields included in entity records may be related to the entity type of the entity record. For example, entity record 162 having a "movie" entity type may include data fields related to a movie, such as a list of actors and a director. Similarly, the entity record 164 having a "comic book" entity type may include data fields related to a comic book, such as author(s) and artist(s). Some data fields which are specific to an entity type may not be as meaningful in an entity record having a different entity type. For example, a data field for a list of actors may not be meaningful in an entity record having a "comic book" entity type.

As described above with reference to FIG. 5, the entity identification module 114 may identify an entity record by detecting matches between terms of the received search query 148 and terms included in at least one of the entity name 154, the entity type 158, and the entity information 160 of the entity record. Accordingly, the entity identification module 114 may identify the entity records 162, 164 when a received search query 148 includes terms that are included in the entity records 162, 164. For example, the entity identification module 114 may identify entity records 162, 164 in response to a search query that includes the words "Dark Knight Rises". In this example, the entity identification module 114 may identify entity records 162, 164 based on matches between words in the search query and words in the entity names 166, 168. Also, the entity identification module 114 may identify the entity records 162, 164 by identifying one or more of the words "Dark Knight Rises" in the entity information 170, 172 of the entity records 162, 164.

In another example, if the search query 148 includes the word "movie", then the entity identification module 114 may identify the entity record 162 that includes the entity type "movie". In this example, the entity identification module 114 may not identify the entity record 164 having the entity type "comic book" unless the entity information 172 of the entity record 164 also includes the word "movie". In another example, if the search query 148 includes the actor name "Christian Bale", the entity identification module 114 may identify the entity record 162 that includes "Christian Bale" in the list of actors. In this example, the entity identification module 114 may not identify the entity record 164 having the entity type "comic book" unless the entity information 172 of the entity record 164 also includes the actor name "Christian Bale".

In another example, the entity identification module 114 may not identify either of the entity records 162, 164 when the search query 148 does not include any words included in the entity records 162, 164. In this example, the entity identification module 114 may identify other entity records included in the entity data store 112. If the entity identification module 114 does not identify other entity records, then the query reformulation module 116 may refrain from generating reformulated queries. In these examples, the application search module 110 may use the received search query 148 to generate search results 150.

The query reformulation module 116 may generate one or more reformulated queries for each of the identified entity records in examples where the entity identification module 114 identifies one or more entity records. In an example where the entity identification module 114 identifies a single entity record, the query reformulation module 116 may generate one or more reformulated queries based on the single identified entity record and the received search query 148. The application search module 110 may perform a search for each of the reformulated queries generated by the query reformulation module 116. In examples where the query reformulation module 116 generates a single reformulated query, the application search module 110 may perform a single search using the single reformulated query. Additionally, the application search module 110 may perform a search using the received query 148. The application search module 110 may then combine both sets of search results into a single set of search results which may be transmitted to the user device 104 that generated the search query 148.

FIG. 7 shows an example method 400 for generating search results based on reformulated queries. The method 400 is described with reference to the entity identification module 114, the query reformulation module 116, and the application search module 110 of FIG. 5. In block 402, the entity identification module 114 receives the search query 148. The search query 148 may be a search query that was generated by a user device 104.

In block 404, the entity identification module 114 identifies a set of entity records in the entity data store 112 based on the received search query 148. The set of entity records may include one or more entity records. In block 406, the query reformulation module 116 generates one or more reformulated queries for each of the identified entity records. In block 408, the application search module 110 performs a search for each of the reformulated queries. In block 410, the application search module 110 generates a set of search results based on the searches performed using the reformulated queries. In some examples, the application search module 110 may also perform a search using the received query 148.

Figure 8:
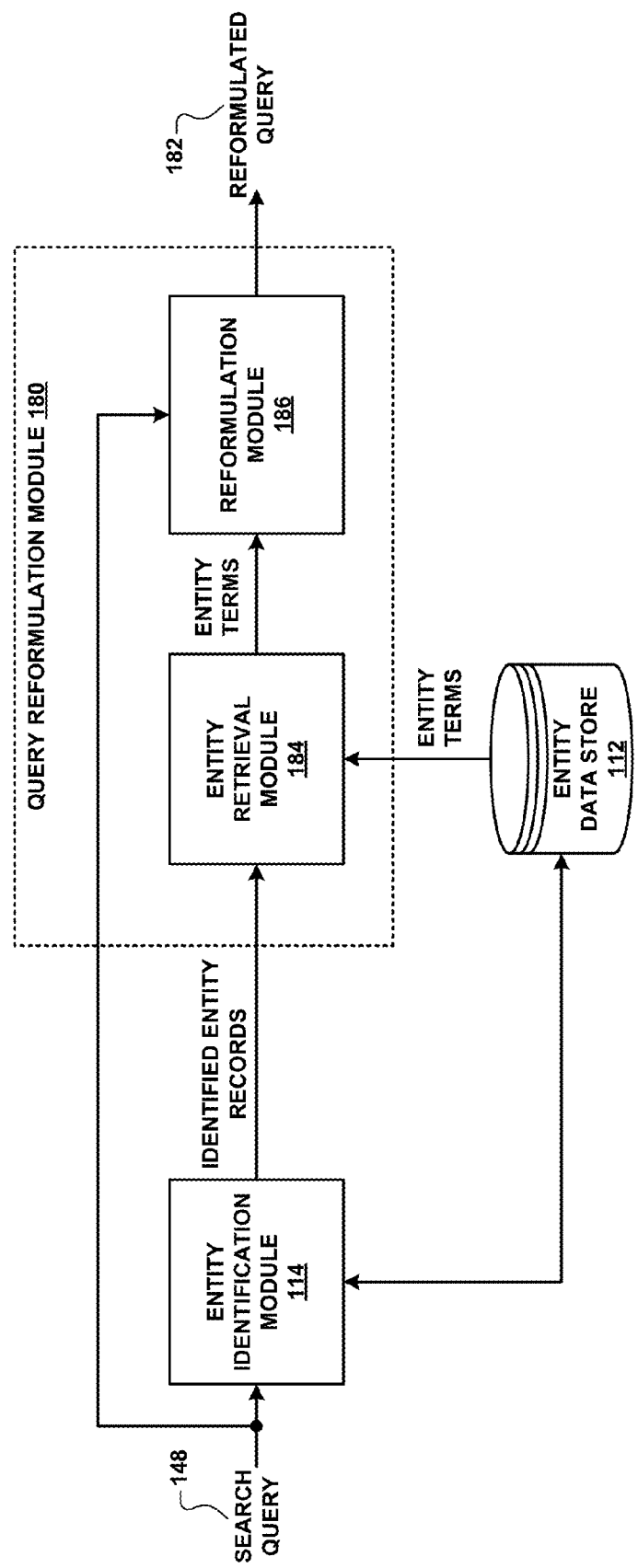
FIG. 8 shows a functional block diagram of an example entity identification module and an example query reformulation module.

FIG. 8 shows a functional block diagram including an example entity identification module 114 and an example query reformulation module 180. In general, the entity identification module 114 and the query reformulation module 180 of FIG. 8 generate a reformulated query 182 by inserting terms (e.g., words, numbers, symbols) from an identified entity record into the received search query 148. FIGS. 9A-14 show different example techniques for inserting terms from an identified entity record into a received search query 148.

The entity identification module 114 identifies an entity record based on the received search query 148, as described above. The query reformulation module 180 includes an entity retrieval module 184 and a reformulation module 186 that generate a reformulated query 182 using terms from the identified entity record. The entity retrieval module 184 may retrieve terms from the identified entity record. The reformulation module 186 may generate the reformulated query 182 by inserting the retrieved terms into the search query 148. In some examples, the reformulation module 186 may replace terms from the search query 148 with terms from the identified entity record. The entity retrieval module 184 may be configured to retrieve any terms from an identified entity record. Accordingly, the reformulation module 186 may generate the reformulated query 182 using any terms from the identified record.

In some implementations, the query reformulation module 180 may be configured to generate the reformulated query 182 by inserting an entity type into the search query 148. In these implementations, the entity retrieval module 184 may identify the entity type of an identified entity record. The reformulation module 186 may then generate the reformulated query 182 by inserting the identified entity type into the search query 148. For example, the reformulation module 186 may replace some terms of the search query 148 with the identified entity type. An example in which the query reformulation module 180 is configured to replace terms of the search query 148 with an identified entity type is illustrated and described with respect to FIGS. 9A-10.

In some implementations, the query reformulation module 180 may be configured to generate the reformulated query 182 by inserting an entity name into the search query 148. In these implementations, the entity retrieval module 184 may identify the entity name of the identified entity record. Then, the reformulation module 186 may generate the reformulated query 182 by inserting the identified entity name into the search query 148. For example, the reformulation module 186 may replace some terms of the search query 148 with the identified entity name. An example in which the query reformulation module 180 is configured to replace terms of the search query 148 with an identified entity name is illustrated and described with respect to FIGS. 11A-12.

In some implementations, the query reformulation module 180 may be configured to generate the reformulated query 182 by inserting terms from the entity information into the search query 148. In these implementations, the entity retrieval module 184 may identify terms from the entity information of the identified entity record. Then, the reformulation module 186 may generate the reformulated query 182 by inserting the identified terms from the entity information into the search query 148. For example, the reformulation module 186 may replace some terms of the search query 148 with the identified terms from the entity information.

In some implementations, the query reformulation module 180 may be configured to generate the reformulated query 182 by inserting any combination of the entity name, the entity type, and terms from the entity information into the received search query 148. In these implementations, the entity retrieval module 184 may identify terms from any combination of the entity name, the entity type, and the entity information. Then, the reformulation module 186 may generate the reformulated query 182 using the identified terms. In one example, the entity retrieval module 184 may identify terms from the entity information and the entity type. In this example, the reformulation module 186 may insert the identified terms from the entity information and the entity type into the search query 148. For example, the reformulation module 186 may replace terms of the search query 148 with terms from the entity information and the identified entity type. An example in which the query reformulation module 180 is configured to replace terms of the search query 148 with terms from entity information and the identified entity type is illustrated and described with respect to FIGS. 13A-14.

Although the functional block diagram of FIG. 8 illustrates generation of a single reformulated query 182 for a received search query 148, it is contemplated that multiple reformulated queries may be generated for the received search query 148. In one example, the entity identification module 114 may identify a single entity record based on the received search query 148. In this example, the reformulation module 186 may generate multiple reformulated queries based on the terms included in the single identified entity record. For example, the entity retrieval module 184 may retrieve the entity name and the entity type, then the reformulation module 186 may generate a first reformulated query and a second reformulated query using the entity name and the entity type, respectively. In another example, the entity identification module 114 may identify multiple entity records. In this example, the reformulation module 186 may generate one or more reformulated queries for each of the identified entity records.

Figure 9A:
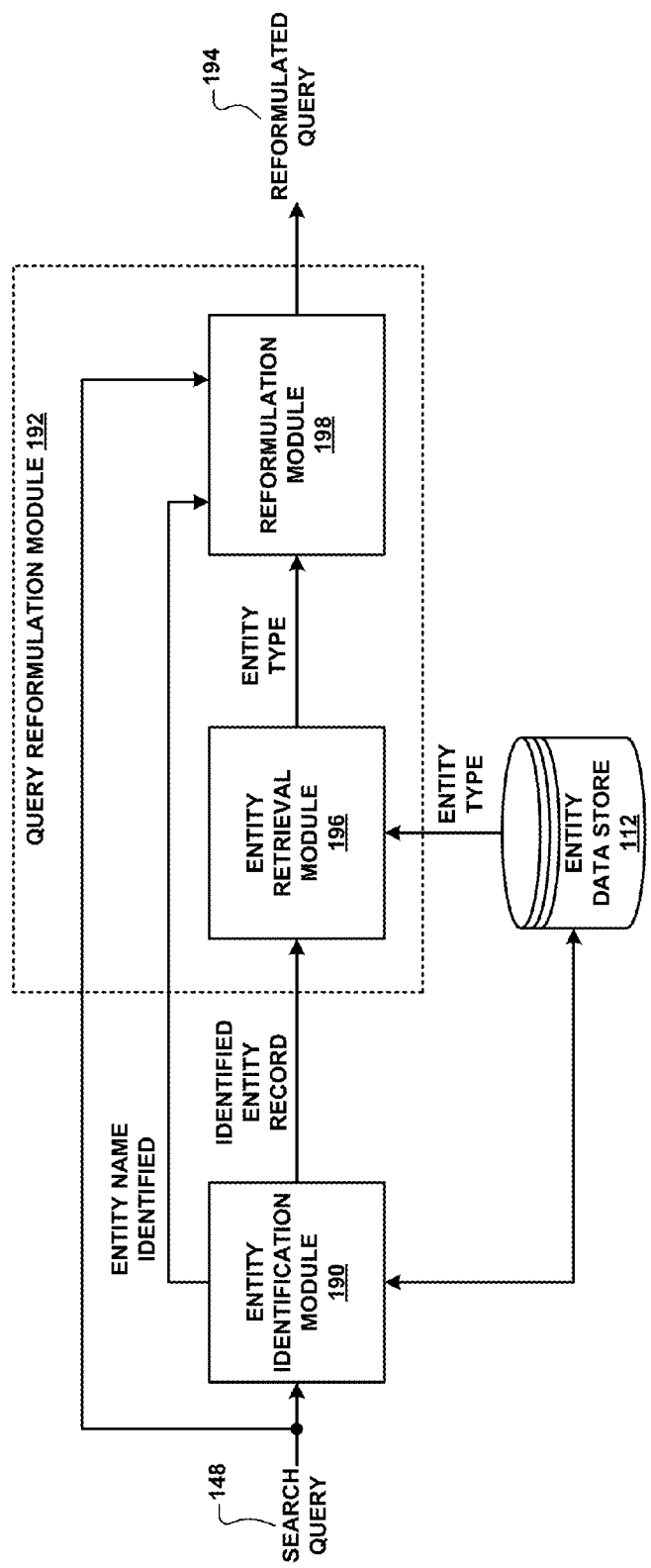
FIGS. 9A-9B are diagrams that show the generation of reformulated queries using an entity type of an identified entity record.
Figure 9B:
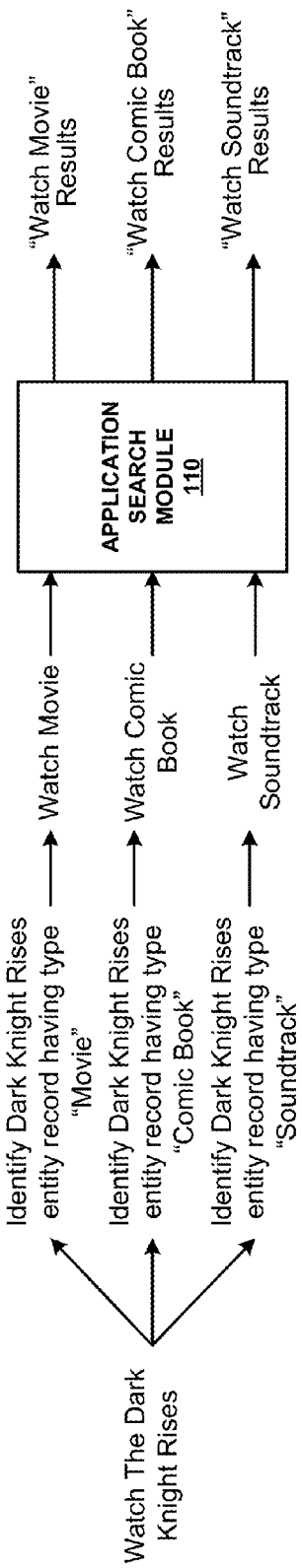
Figure 10:
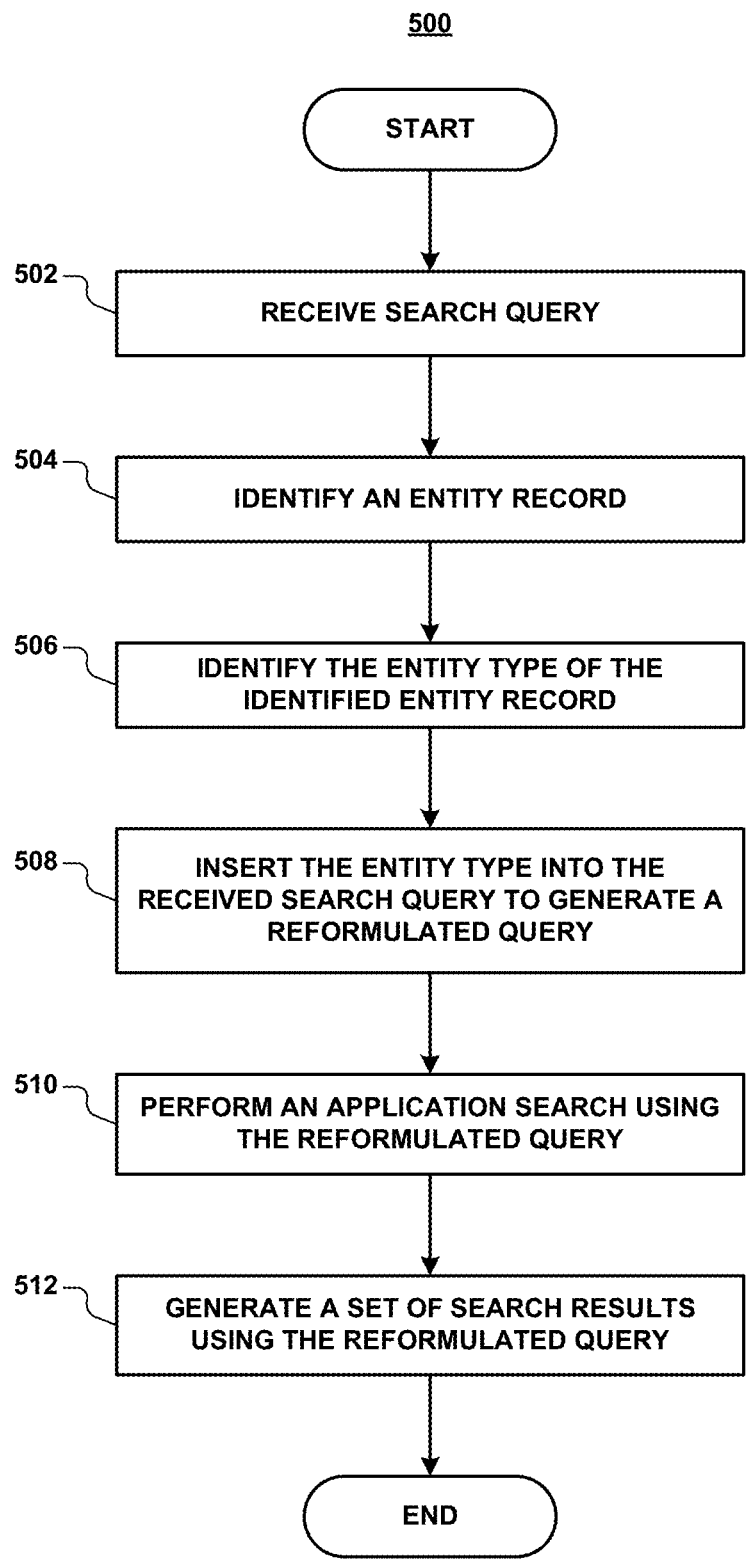
FIG. 10 shows an example method for generating reformulated queries using an entity type of an identified entity record.
Figure 11A:
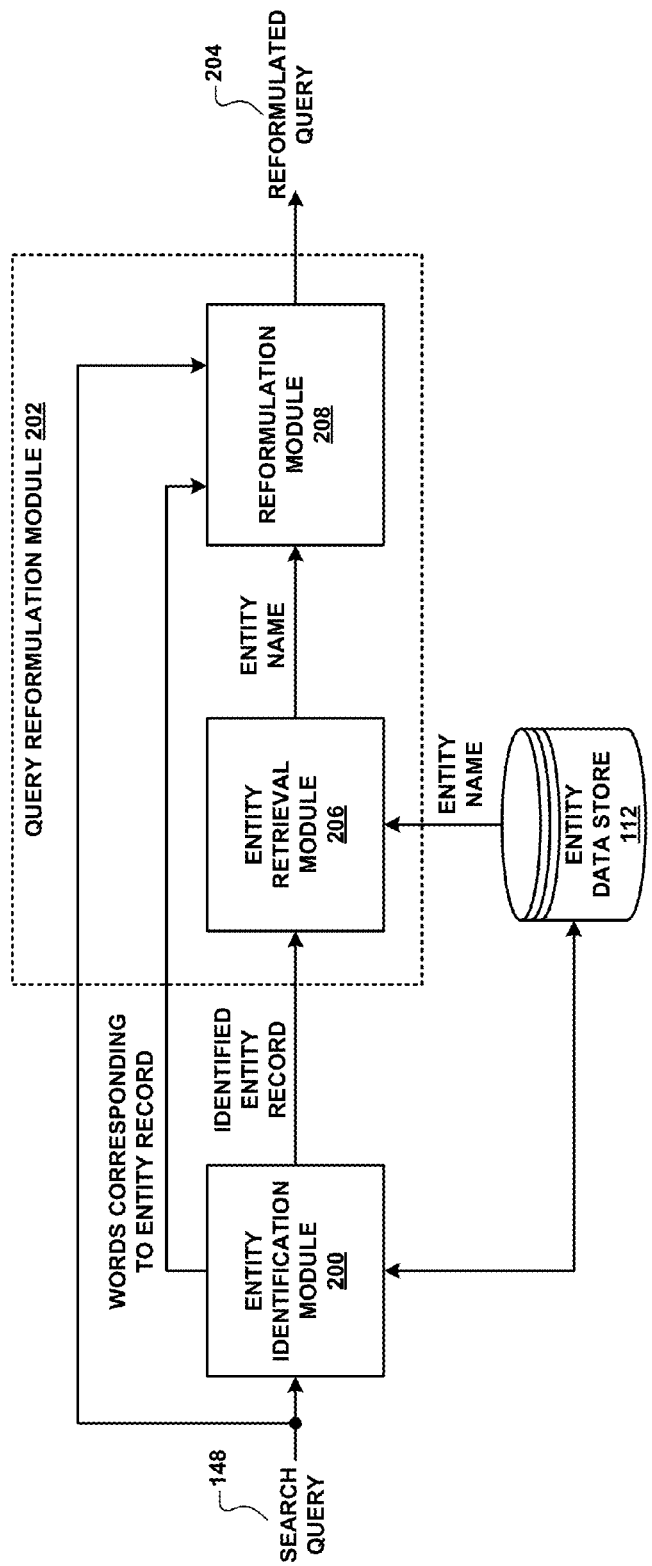
FIGS. 11A-11B are diagrams that show the generation of reformulated queries using an entity name of an identified entity record.
Figure 11B:
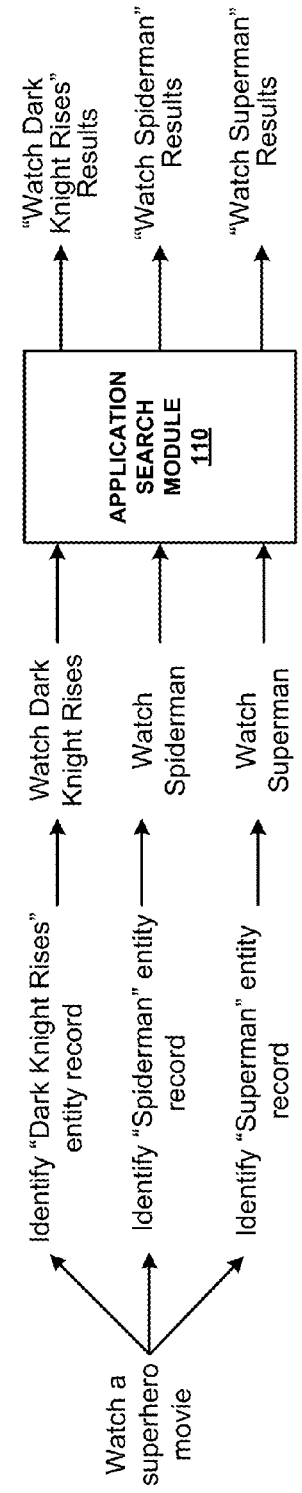
Figure 12:
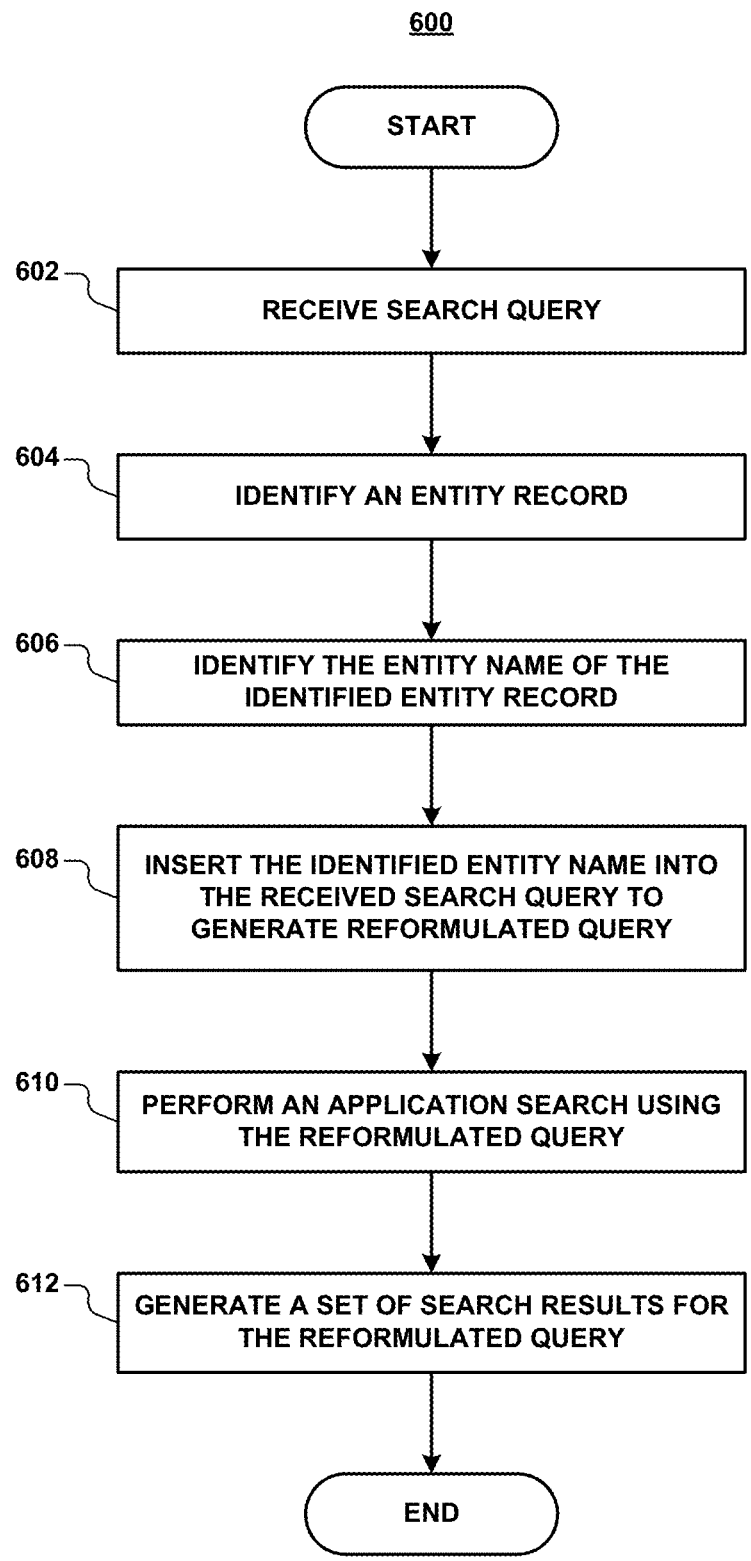
FIG. 12 shows an example method for generating reformulated queries using an entity name of an identified entity record.
Figure 13A:
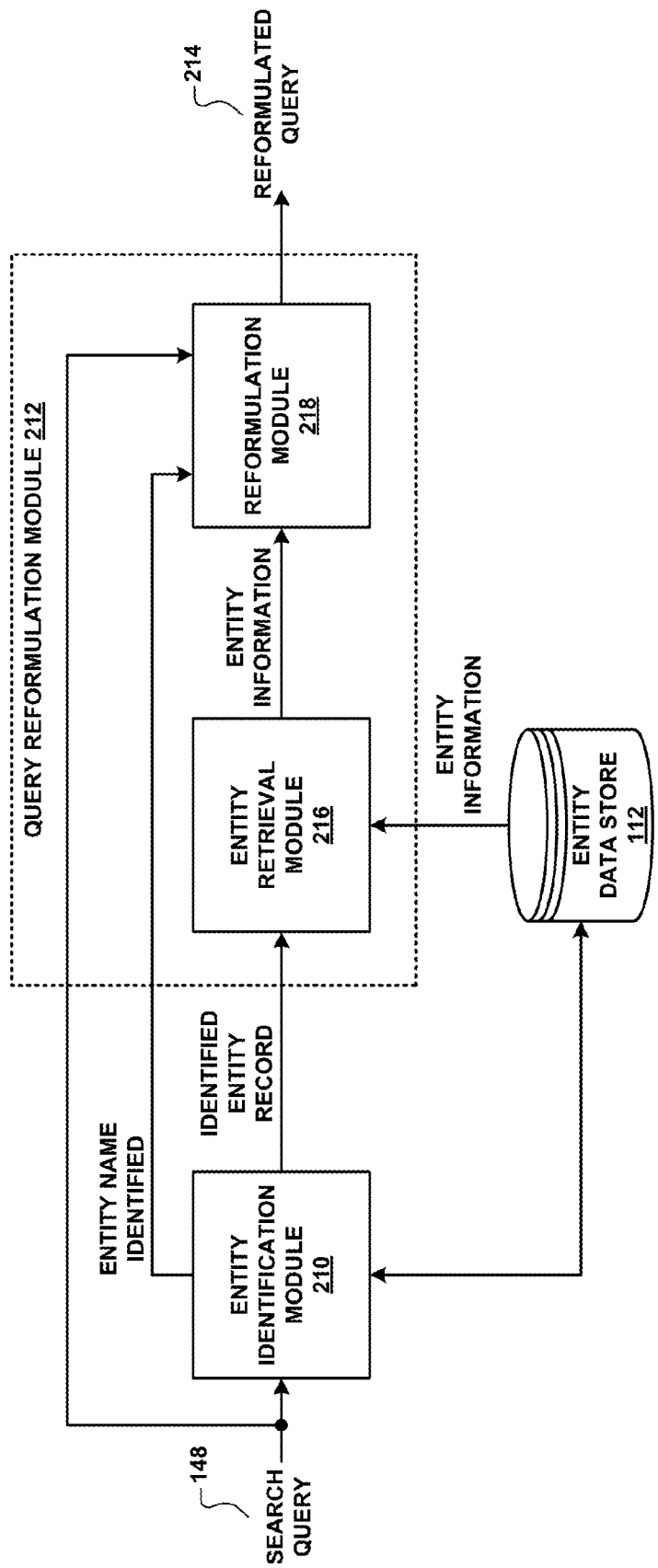
Figure 14:
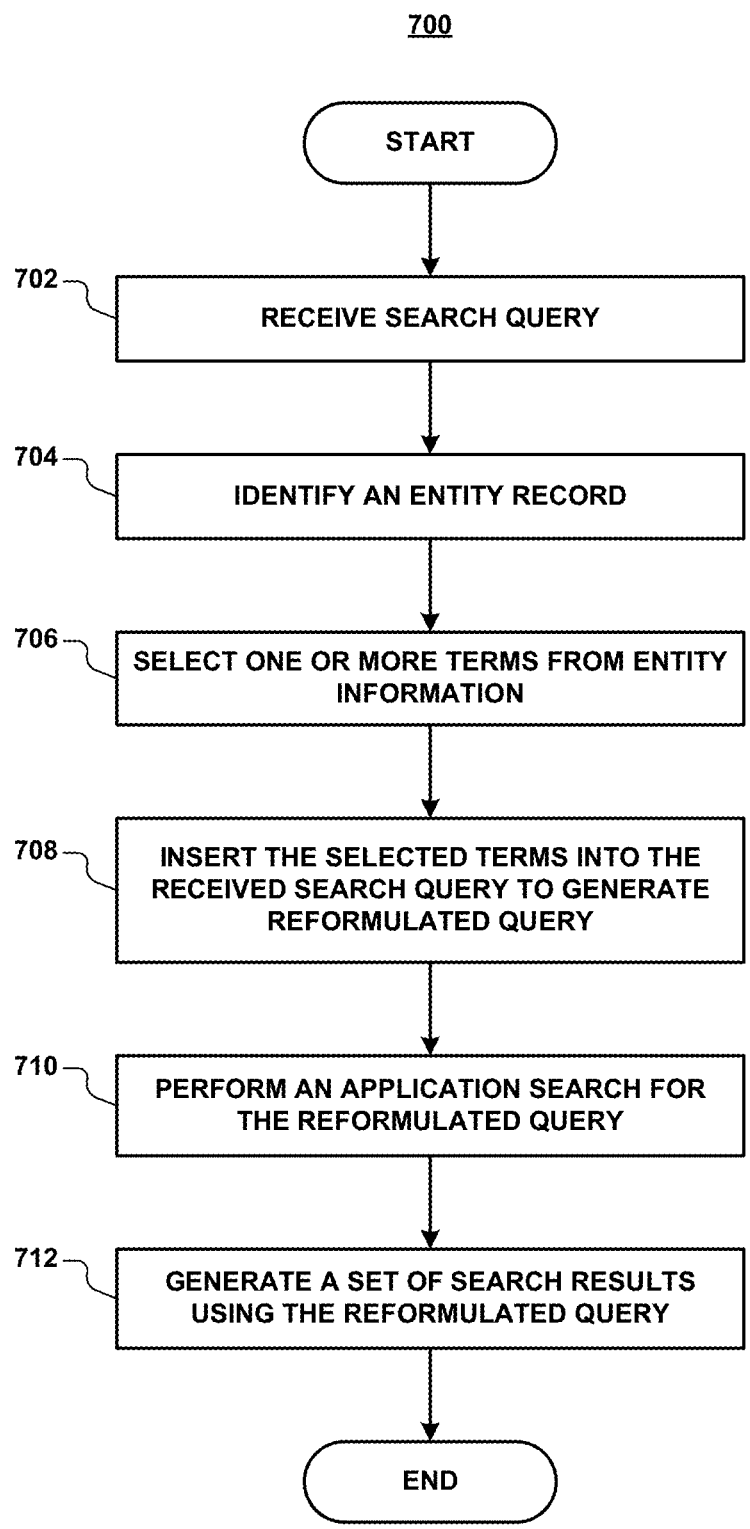
FIG. 14 shows an example method for generating reformulated queries using terms from entity information of an identified entity record.

FIGS. 9A-14 describe a variety of different ways to generate reformulated queries based on the received search query 148 and terms from an identified entity record. FIGS. 9A-10 describe the generation of a reformulated query using the entity type of an identified entity record. FIGS. 11A-12 describe the generation of a reformulated query using the entity name of an identified entity record. FIGS. 13A-14 describe the generation of a reformulated query using terms from the entity information and the entity type of an identified entity record. Although the functional block diagrams of FIGS. 9A, 11A, and 13A illustrate generation of a single reformulated query for a received search query 148, as described above, multiple reformulated queries may be generated for the received search query 148. The generation of reformulated queries according to FIGS. 9A-14 are now described in turn.

FIG. 9A shows an example entity identification module 190 and an example query reformulation module 192 that generate a reformulated query 194 by inserting the entity type of an identified entity record into the received search query 148. FIG. 9B is a diagram that shows an example search query and example reformulated queries which may be generated according to the functional block diagram of FIG. 9A. FIG. 10 shows an example method for generating reformulated queries using an entity type of an identified entity record.

Referring now to FIG. 9A, the entity identification module 190 identifies an entity record based on the received search query 148. The query reformulation module 192 includes an entity retrieval module 196 and a reformulation module 198 that generate a reformulated query 194 using terms from the identified entity record. For example, the entity retrieval module 196 and the reformulation module 198 may generate the reformulated query 194 by inserting the entity type of the identified entity record into the search query 148.

The entity identification module 190 identifies an entity record based on the search query 148. The entity identification module 190 also determines that one or more words of the search query 148 correspond to the entity name of the identified entity record. The entity retrieval module 196 identifies the entity type of the identified entity record. The reformulation module 198 then replaces the words of the search query 148 corresponding to the entity name with the entity type identified by the entity retrieval module 196. The diagram of FIG. 9B shows how the entity identification module 190 and the query reformulation module 192 may generate multiple reformulated queries based on a received search query 148. Operation of the entity identification module 190 and the query reformulation module 192 in response to the search query "Watch The Dark Knight Rises" is now described with reference to FIG. 9B.

In FIG. 9B, the entity identification module 190 receives the search query "Watch The Dark Knight Rises". The entity identification module 190 identifies three different entity records corresponding to the search query "Watch The Dark Knight Rises". For example, the entity identification module 190 identifies an entity record named "Dark Knight Rises" having the entity type "Movie", an entity record named "Dark Knight Rises" having the entity type "Comic Book", and an entity record named "Dark Knight Rises" having the entity type "Soundtrack".

The reformulation module 198 generates a reformulated query for each of the identified entity records. In the example of FIG. 9B, the entity identification module 190 determines that the names of the identified entity records are included in the search query. The reformulation module 198 replaces the entity name included in the search query with the entity types of the identified entity records. For example, the reformulation module 198 generates the reformulated query "Watch Movie" by replacing the words "Dark Knight Rises" in the search query with the "Movie" entity type of the entity record named "Dark Knight Rises". Similarly, the reformulation module 198 generates the reformulated query "Watch Comic Book" by replacing the words "Dark Knight Rises" in the search query with the "Comic Book" entity type of the entity record named "Dark Knight Rises". The reformulation module 198 also generates a third reformulated query "Watch Soundtrack" by replacing the words "Dark Knight Rises" in the search query with the "Soundtrack" entity type of the entity record named "Dark Knight Rises". The stop word "the" has been removed from the entity names and reformulated queries in the example of FIG. 9B.

The application search module 110 performs a search for each of the three reformulated queries. Accordingly, the application search module 110 generates a set of search results for the reformulated query "Watch Movie", the reformulated query "Watch Comic Book", and the reformulated query "Watch Soundtrack". The application search module 110 may combine the sets of search results for each of the reformulated queries into one set of search results. The search results may include a list of applications and corresponding result scores generated as a result of the searches performed using the reformulated queries. In some examples, the application search module 110 may also perform a search using the search query "Watch The Dark Knight Rises". In these examples, the application search module 110 may combine the search results generated using the search query along with the results generated using the reformulated queries.

FIG. 10 shows a method 500 for generating a reformulated query using an entity type of an identified entity record. The method 500 is described with reference to the entity identification module 190, the query reformulation module 192, and the application search module 110 of FIGS. 9A-9B.

In block 502, the entity identification module 190 receives a search query 148. The search query 148 may be a search query that was generated by a user device 104.

In block 504, the entity identification module 190 identifies an entity record in the entity data store 112. In block 506, the entity retrieval module 196 identifies the entity type of the identified entity record. In block 508, the reformulation module 198 generates a reformulated query 194 by inserting the identified entity type into the received search query 148. For example, the reformulation module 198 may generate the reformulated query by replacing words of the search query (e.g., an entity name in the search query) with the entity type of the identified entity record.

In block 510, the application search module 110 performs a search of the application data store 108 using the reformulated query. In block 512, the application search module 110 generates a set of search results for the reformulated query. Although the method 500 describes the generation of a single reformulated query based on identification of a single entity record, it is contemplated that some, or all, of the method 500 may be repeated in order to generate one or more reformulated queries using one or more identified entity records.

FIG. 11A shows an example entity identification module 200 and an example query reformulation module 202 that generate a reformulated query 204 by inserting the entity name of an identified entity record into the received search query 148. FIG. 11B is a diagram that shows an example search query and example reformulated queries which may be generated according to the functional block diagram of FIG. 11A. FIG. 12 shows an example method for generating reformulated queries using an entity name.

Referring now to FIG. 11A, the entity identification module 200 identifies an entity record based on the received search query 148. The query reformulation module 202 includes an entity retrieval module 206 and a reformulation module 208 that generate the reformulated query 204 by inserting the entity name of the identified entity record into the search query 148. An example in which a reformulated query is generated by replacing words of the search query 148 with an entity name is now described.

The entity identification module 200 identifies an entity record based on the search query 148. The entity identification module 200 also identifies one or more words of the search query 148 which correspond to the identified entity record. For example, the one or more words corresponding to the identified entity record may be words that are included in the identified entity record. The entity retrieval module 206 identifies the entity name of the identified entity record. The reformulation module 208 then replaces the words of the search query 148 corresponding the identified entity record with the identified entity name in order to generate the reformulated query 204. The diagram of FIG. 11B shows how the entity identification module 200 and the query reformulation module 202 may generate multiple reformulated queries based on a received search query 148. Operation of the entity identification module 200 and the query reformulation module 202 in response to the search query "Watch a superhero movie" is now described.

In FIG. 11B, the entity identification module 200 receives the search query "Watch a superhero movie". The entity identification module 200 identifies three different entity records corresponding to the search query "Watch a superhero movie". For example, the entity identification module 200 identifies an entity record named "Dark Knight Rises", an entity record named "Spiderman", and an entity record named "Superman". These entity records may have a "movie" entity type.

The reformulation module 208 generates a reformulated query for each of the identified entity records. In the example of FIG. 11B, the entity identification module 200 determines that the words "superhero movie" correspond to the identified entity records. For example, the entity identification module 200 may determine that the identified entity records include the words "superhero" and "movie" in the entity type fields and/or the entity information (e.g., a film genre field, review text, etc.). The reformulation module 208 replaces the words "superhero movie" included in the search query with the entity names of the entity records to generate the reformulated queries. With respect to FIG. 11B, the reformulation module 208 generates the reformulated query "Watch Dark Knight Rises" by replacing the words "superhero movie" in the search query with the entity name "Dark Knight Rises". Similarly, the reformulation module 208 generates the reformulated query "Watch Spiderman" by replacing the words "superhero movie" in the search query with the entity name "Spiderman". The reformulation module 208 also generates a reformulated query "Watch Superman" by replacing the words "superhero movie" in the search query with the entity name "Superman". The stop word "a" has been removed from the reformulated queries in the example of FIG. 11B.

The application search module 110 performs a search for each of the three reformulated queries. Accordingly, the application search module 110 generates a set of search results for the reformulated query "Watch Dark Knight Rises", the reformulated query "Watch Spiderman", and the reformulated query "Watch Superman". The application search module 110 may combine the sets of search results for each of the reformulated queries into one set of search results. The search results may include a list of applications and corresponding result scores generated as a result of the searches performed using the reformulated queries. In some examples, the application search module 110 may also perform a search using the search query "Watch a superhero movie". In these examples, the application search module 110 may combine the search results generated using the search query along with the results generated using the reformulated queries.

FIG. 12 shows a method 600 for generating a reformulated query using an entity name of an identified entity record. The method 600 is described with reference to the entity identification module 200, the query reformulation module 202, and the application search module 110 of FIGS. 11A-11B. In block 602, the entity identification module 200 receives a search query 148. The search query 148 may be a search query that was generated by a user device 104.

In block 604, the entity identification module 200 identifies an entity record in the entity data store 112. In block 606, the entity retrieval module 206 identifies an entity name of the identified entity record. In block 608, the reformulation module 208 generates a reformulated query by inserting the identified entity name into the received search query. For example, the reformulation module 208 may generate the reformulated query by replacing words of the search query (e.g., words corresponding to the identified entity record) with the entity name of the identified entity record.

In block 610, the application search module 110 performs a search of the application data store 108 using the reformulated query. In block 612, the application search module 110 generates a set of search results for the reformulated query. Although the method 600 describes the generation of a single reformulated query based on identification of a single entity record, it is contemplated that some, or all, of the method 600 may be repeated in order to generate one or more reformulated queries using one or more identified entity records.

FIG. 13A shows an example entity identification module 210 and an example query reformulation module 212 that generate a reformulated query 214 by inserting terms from the entity information of an identified entity record into the received search query 148. FIGS. 13B-13C are diagrams that show example search queries and example reformulated queries which may be generated according to the functional block diagram of FIG. 13A. FIG. 14 shows an example method for generating reformulated queries using terms from the entity information of an identified entity record.

Referring now to FIG. 13A, the query reformulation module 212 identifies an entity record based on the received search query 148. The query reformulation module 212 includes an entity retrieval module 216 and a reformulation module 218 that generate the reformulated query 214 by inserting words from entity information of the identified entity record into the search query 148. The entity retrieval module 216 selects words from the entity information of the identified entity record. The reformulation module 218 generates the reformulated query 214 by inserting the selected words into the search query 148. In some examples, the reformulation module 218 may replace words from the search query 148 with the words selected from the entity information. An example in which a reformulated query is generated by replacing words from the search query with words from entity information is now described.

The entity identification module 210 identifies words in the search query 148 that correspond to the identified entity record. For example, words of the search query 148 may correspond to an entity name of the identified entity record. The entity retrieval module 216 then selects words from the entity information of the identified entity record. The reformulation module 218 may replace the words of the search query 148 corresponding to the identified entity record with the selected words from the entity information. Operation of the entity identification module 210 and the query reformulation module 212 in response to the search queries "Watch The Dark Knight Rises" and "Watch The Lion King" is now described with reference to FIGS. 13B-13C.

The diagram of FIG. 13B shows one example of how the entity identification module 210 and the query reformulation module 212 may generate multiple reformulated queries based on a received search query 148. The diagram of FIG. 13B specifically shows a case where the entity identification module 210 and the query reformulation module 212 are configured to insert actor names and entity types into a search query in place of a movie name. Put another way, the entity identification module 210 and the query reformulation module 212 are configured to generate a reformulated query by identifying a movie entity record in a search query and then replacing the entity name in the search query with an actor from the movie. Along with the actor name, the reformulation module 218 is configured to insert the entity type "Movie". The insertion of actors' names in place of an identified movie name is only one example of inserting terms from entity information into a search query. It is contemplated that terms from entity information may be used to generate reformulated queries in a manner other than that illustrated in FIG. 13B.

In FIG. 13B, the entity identification module 210 receives the search query "Watch The Dark Knight Rises". The entity identification module 210 identifies a single entity record corresponding to the search query "Watch The Dark Knight Rises". Specifically, the identified entity record may be the entity record named "Dark Knight Rises" having a "Movie" entity type.

The reformulation module 218 generates reformulated queries for the identified entity record. In the example of FIG. 13B, the entity identification module 210 determines that the words "Dark Knight Rises" correspond to the entity name of the identified entity record. The reformulation module 218 replaces the words "Dark Knight Rises" included in the search query with the names of actors from the movie "Dark Knight Rises" to generate the reformulated queries. The reformulation module 218 may retrieve the actors' names from a field (e.g., a predefined field) in the entity information of the identified movie entity record named "Dark Knight Rises". With respect to FIG. 13B, the reformulation module 218 generates the reformulated query "Watch Christian Bale Movie" by replacing the words "Dark Knight Rises" in the search query with the actor name "Christian Bale" and the entity type "Movie". Similarly, the reformulation module 218 generates the reformulated query "Watch Gary Oldman Movie" by replacing the words "Dark Knight Rises" in the search query with the actor name "Gary Oldman" and the entity type "Movie". The reformulation module 218 also generates the reformulated query "Watch Morgan Freeman Movie" by replacing the words "Dark Knight Rises" in the search query with the actor name "Morgan Freeman" and the entity type "Movie".

The application search module 110 performs a search for each of the three reformulated queries. Accordingly, the application search module 110 generates a set of search results for the reformulated query "Watch Christian Bale Movie", the reformulated query "Watch Gary Oldman Movie", and the reformulated query "Watch Morgan Freeman Movie". The application search module 110 may combine the sets of search results for each of the reformulated queries into one set of search results. The search results may include a list of applications and corresponding result scores generated as a result of the searches performed using the reformulated queries. In some examples, the application search module 110 may also perform a search using the search query "Watch The Dark Knight Rises". In these examples, the application search module 110 may combine the search results generated using the search query along with the results generated using the reformulated queries.

The diagram of FIG. 13C shows another example of how the entity identification module 210 and the query reformulation module 212 may generate multiple reformulated queries based on a received search query 148. The diagram of FIG. 13C shows a case where the entity identification module 210 and the query reformulation module 212 are configured to insert a production company's name into the search query in place of a movie name. FIG. 13C also shows a case where the entity identification module 210 and the query reformulation module 212 are configured to insert a description of a movie into the search query in place of a movie name. It is contemplated that terms from entity information may be used to generate reformulated queries in a manner other than that illustrated in FIGS. 13B-13C.

In FIG. 13C, the entity identification module 210 receives the search query "Watch The Lion King". The entity identification module 210 identifies a single entity record corresponding to the search query "Watch The Lion King". Specifically, the identified entity record may be the entity record named "Lion King" having a "Movie" entity type.

The reformulation module 218 generates reformulated queries for the identified entity record. In the example of FIG. 13C, the entity identification module 210 determines that the words "Lion King" correspond to the entity name of the identified entity record. The reformulation module 218 replaces the words "Lion King" included in the search query with the name of the production company "Disney" and the entity type "Movie" to generate the reformulated query "Watch Disney Movie". The reformulation module 218 may retrieve the production company name from a field (e.g., a predefined field) in the entity information of the identified movie entity record named "Lion King". With respect to FIG. 13C, the reformulation module 218 also generates the reformulated query "Watch Animated Musical" by replacing the words "Lion King" in the search query with the description "Animated Musical", which may be a description included in the entity information of the "Lion King" entity record.

The application search module 110 performs a search for each of the reformulated queries. Accordingly, the application search module 110 generates a set of search results for the reformulated query "Watch Disney Movie" and the reformulated query "Watch Animated Musical". The application search module 110 may combine the sets of search results for each of the reformulated queries into one set of search results. The search results may include a list of applications and corresponding result scores generated as a result of the searches performed using the reformulated queries. In some examples, the application search module 110 may also perform a search using the search query "Watch The Lion King". In these examples, the application search module 110 may combine the search results generated using the search query along with the results generated using the reformulated queries.

FIG. 14 shows a method 700 for generating a reformulated query using one or more terms from entity information of an identified entity record. The method 700 is described with reference to the entity identification module 210, the query reformulation module 212, and the application search module 110 of FIGS. 13A-13C. In block 702, the entity identification module 210 receives a search query 148. The search query 148 may be a search query that was generated by a user device 104.

In block 704, the entity identification module 210 identifies an entity record in the entity data store 112. In block 706, the entity retrieval module 216 selects one or more terms from the entity information of the identified entity record. In block 708, the reformulation module 218 generates a reformulated query 214 by inserting the selected one or more terms into the received search query 148. For example, the reformulation module 218 may generate the reformulated query 214 by replacing words of the search query 148 (e.g., an entity name in the search query) with the selected one or more terms.

In block 710, the application search module 110 performs a search of the application data store 108 using the reformulated query. In block 712, the application search module 110 generates a set of search results for the reformulated query. Although the method 700 describes the generation of a single reformulated query based on identification of a single entity record, it is contemplated that some, or all, of the method 700 may be repeated in order to generate one or more reformulated queries using one or more identified entity records.

As described above, a set of search results may include a list of applications which are each associated with a result score. The result scores may be generated in a variety of different ways. In some examples, the search system 102 may generate the result scores based on entity-related values that may be included in the entity records and/or determined after receiving the search query. The entity-related values described herein include entity quality scores and query-entity alignment scores. Weighting search results using entity-related values is described herein with respect to FIGS. 15A, and 16A-17.

Figure 15C:
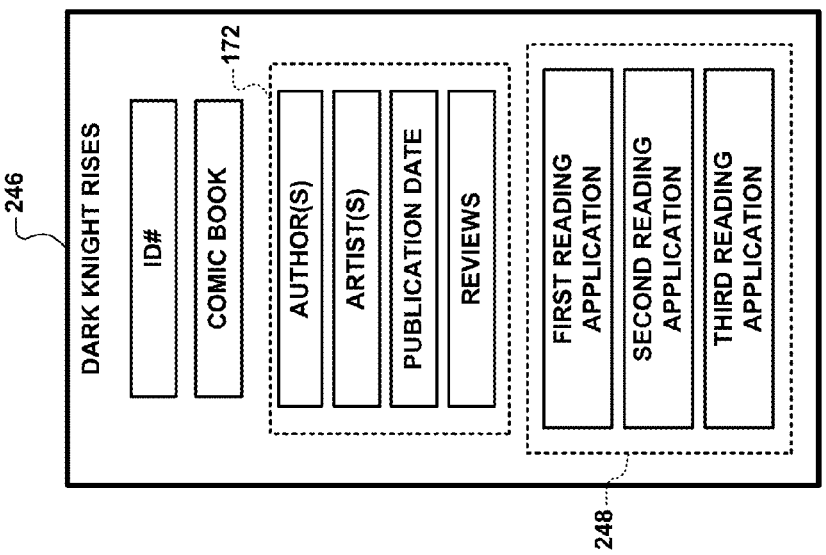
FIGS. 15B-15C show example entity records that include a list of associated applications.
Figure 15B:
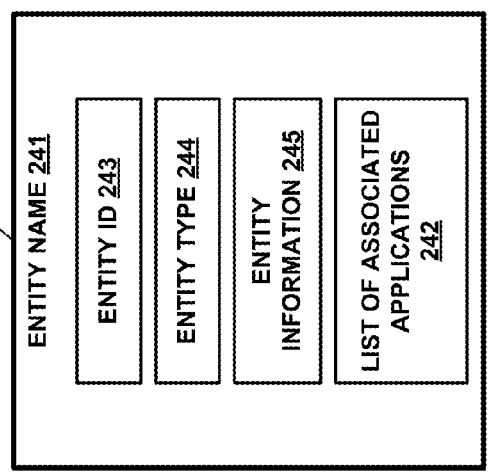
Figure 15A:
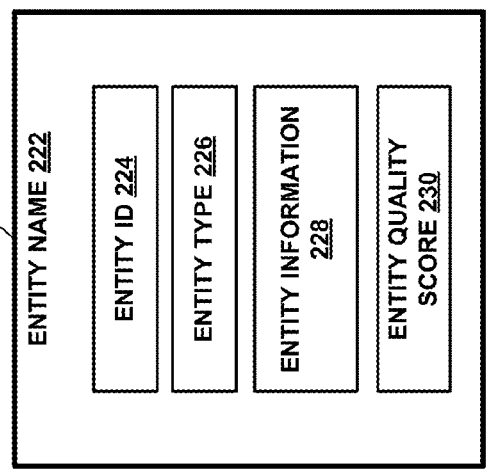
FIG. 15A shows an example entity record that includes an entity quality score.

Referring now to FIG. 15A, an example entity record 220 includes an entity name 222, an entity ID 224, an entity type 226, and entity information 228, as described with respect to entity record 152 of FIG. 6A. The entity record 220 also includes an entity quality score 230. In some implementations, the search system 102 may determine a result score associated with an application based on the entity quality score 230. For example, the entity quality score 230 may be a number used by the search system 102 to weight an initial score of an application, as described with respect to FIGS. 16A-17.

In some implementations, the entity quality score 230 may indicate the relative popularity of the entity described by the entity record 220. For example, if two different entity records are related to songs, the entity record for the more popular song (e.g., more downloaded song) may include a larger entity quality score than an entity record associated with a less popular song. A larger entity quality score may tend to produce a larger result score. Applications associated with larger result scores in the search results may be ranked higher in the search results. In some implementations, the entity quality score 230 may range from 0.0 to 1.0.

The entity quality score 230 may be thought of as a ranking of an entity within a category (e.g., within an entity type). The search system 102 may generate the entity quality score 230 in different ways for different types of entities. Different ways in which the search system 102 may assign an entity quality score 230 are now described. An entity record associated with a city may be assigned an entity quality score based on the population of the city. For example, entity records associated with cities having greater populations may receive greater entity quality scores (e.g., nearer to 1.0). An entity record associated with a restaurant may be assigned an entity quality score based on review ratings associated with the restaurant. For example, entity records associated with restaurants that receive better ratings (e.g., on restaurant review websites) may be assigned greater entity quality scores. An entity record associated with a product (e.g., available on a shopping website) may be assigned an entity quality score based on the sales numbers associated with the product. An entity record associated with a famous person may be assigned an entity quality score based on the number of times their name is mentioned on various websites (e.g., news websites).

The search system 102 may also weight a result score using a query-entity alignment score. A query-entity alignment score may be a number that indicates how well the text of the received search query matches with the text included in the entity record that was identified based on the received search query. The search system 102 (e.g., the entity identification module 114) may generate the query-entity alignment score after identifying one or more entity records. The query-entity alignment score may be larger in cases where the text of the received search query more closely matches the text of the entity record. Put another way, the query-entity alignment score may be larger when more matches are identified between words in the search query and words in the identified entity record. A larger query-entity alignment score may tend to produce a larger result score.

The search system 102 may determine a result score associated with an application using the query-entity alignment score and/or the entity quality score 230. Accordingly, the result score associated with an application may be based on the query-entity alignment score and/or the entity quality score 230. In some implementations, the search system 102 may determine a result score for an application based on both the query-entity alignment score and the entity quality score. In some implementations, the search system 102 may determine a result score for an application based on the query-entity alignment score without taking into account an entity quality score. In other implementations, the search system 102 may determine a result score for an application based on the entity quality score without taking into account the query-entity alignment score. In still other implementations, the search system 102 may not take into account either the query-entity alignment score or the entity quality score when determining the result score associated with an application.

Figure 16A:
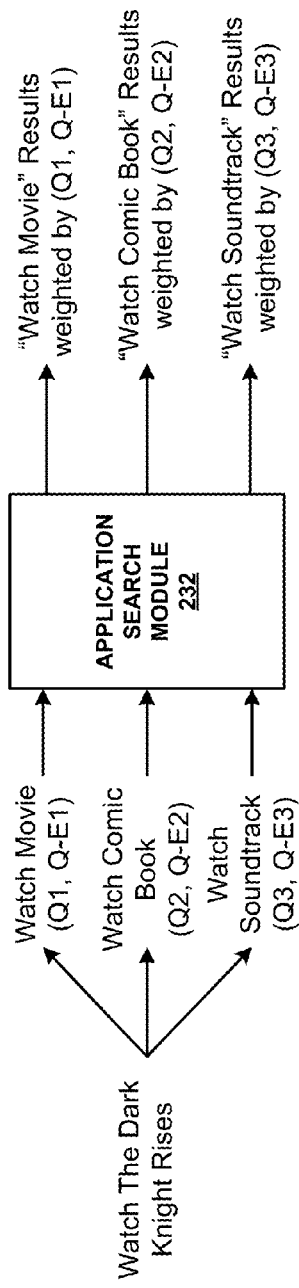
FIGS. 16A-16B are diagrams that show how reformulated queries and search results may be associated with entity-related values.
Figure 16B:
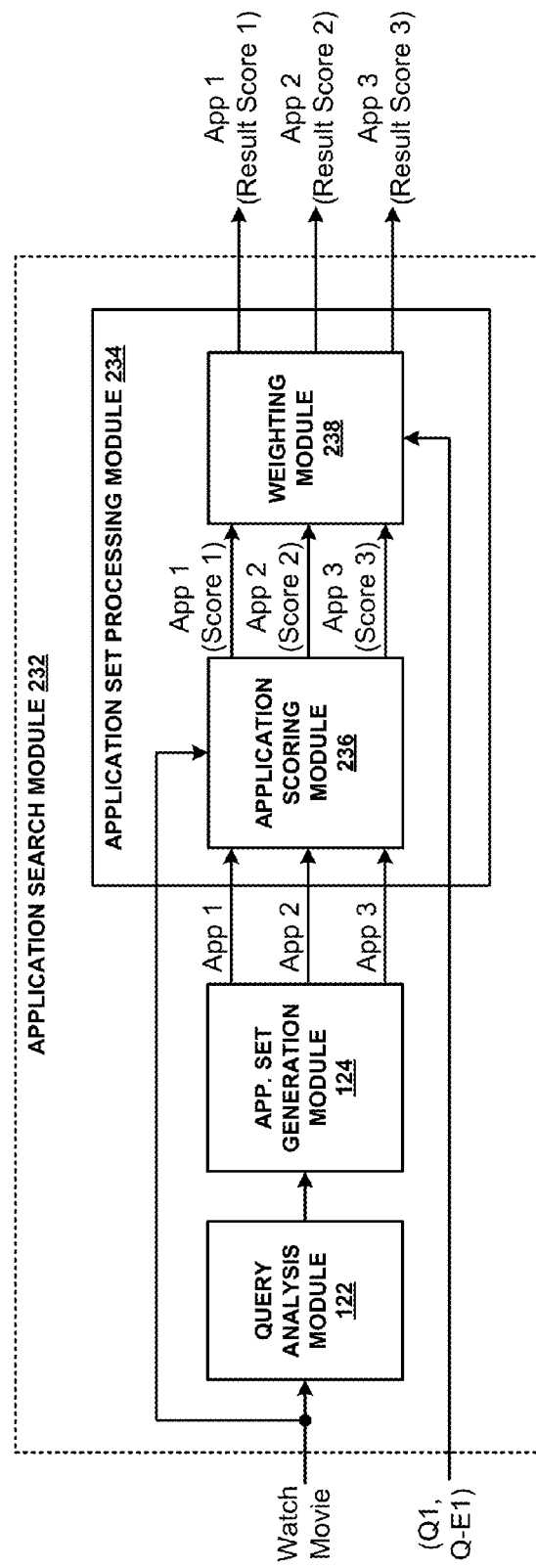

FIGS. 16A-16B show an example of search system 102 weighing application search results using a query-entity alignment score and an entity quality score. FIG. 16A is a diagram that shows how reformulated queries and search results may be associated with entity-related values. FIG. 16B shows an example application search module that determines result scores based on query-entity alignment scores and entity quality scores.

In FIG. 16A, the search system 102 receives the search query "Watch The Dark Knight Rises". As described above with respect to FIG. 9B, the entity identification module 190 may identify three separate entity records based on the search query. In the example of FIG. 16A, as described above with respect to FIG. 9B, the entity identification module 190 identified three different entity records corresponding to the search query "Watch The Dark Knight Rises". Specifically, the entity identification module 190 identified an entity record for a "Movie", a "Comic Book", and a "Soundtrack". The reformulation module 198 generated a reformulated query for each of the identified entity records by replacing terms from the received search query with the entity type of the identified entity records.

Each of the three reformulated queries in FIG. 16A is associated with two entity-related values. Specifically, each of the three reformulated queries is associated with a different entity quality score (e.g., Q1, Q2, Q3) and a different query-entity alignment score (e.g., Q-E1, Q-E2, Q-E3). The entity quality scores (Q1, Q2, Q3) associated with each reformulated query may be the entity quality scores included in the entity records which were used to generate the reformulated queries. For example, with respect to the reformulated query "Watch Movie", the entity quality score Q1 may be the quality score included in the entity record named "Dark Knight Rises" which has an entity type "Movie". The query-entity alignment scores (Q-E1, Q-E2, Q-E3) associated with each reformulated query may be a number that indicates how well terms from the search query matched terms from the entity record used to generate the reformulated query. For example, with respect to the reformulated query "Watch Movie", the query-entity alignment score Q-E1 may be a number that indicates how well the search query "Watch The Dark Knight Rises" matches terms from the entity record named "Dark Knight Rises" which has an entity type "Movie".

The application search module 232 may perform a search using each of the reformulated queries. The application search module 232 may generate the result scores based on the entity quality scores (Q1, Q2, Q3) and the query-entity alignment scores (Q-E1, Q-E2, Q-E3). For example, the application search module 232 may generate search results for the query "Watch Movie" that includes a list of applications and corresponding result scores which are based on the entity quality score Q1 and the query-entity alignment score Q-E1. Put another way, the result scores generated based on the query "Watch Movie" may be weighted by the entity quality score Q1 and the query-entity alignment score Q-E1. The application search module 232 may generate search results for the queries "Watch Comic Book" and "Watch Soundtrack" in a similar manner.

FIG. 16B shows an example application search module 232 that generates a set of search results for the reformulated query using the entity quality score Q1 and the query-entity alignment score Q-E1 described in FIG. 16A. In FIG. 16B, the application search module 232 receives the reformulated query "Watch Movie", the entity quality score Q1, and the query-entity alignment score Q-E1. The query analysis module 122 analyzes the query, as described above. The set generation module 124 identifies a consideration set of applications including App 1, App 2, and App 3, as described above.

An example set processing module 234 processes the consideration set using the received entity-related values. The set processing module 234 includes an application scoring module 236 and an example weighting module 238. The application scoring module 236 generates initial scores for each of the applications App 1, App 2, and App 3. The initial scores are indicated in FIG. 16B as Score 1, Score 2, and Score 3. The application scoring module 236 may generate initial scores in the manner described above with respect to FIG. 2. For example, the application scoring module 236 may generate an initial score based on one or more scoring features, such as application scoring features, query scoring features, and application-query scoring features. In some examples, the application scoring module 236 may include one or more machine learned models configured to receive one or more scoring features.

The weighting module 238 generates result scores based on the initial scores, the entity quality score Q1, and the query-entity alignment score Q-E1. For example, the weighting module 238 may multiply each of the initial scores by the entity quality score Q1 and the query-entity alignment score Q-E1 to generate the search results. With respect to the initial score for App 1 (i.e., Score 1), the weighting module 238 may multiply the initial score for App 1 by the entity quality score Q1 and the query-entity alignment score Q-E1. The result scores associated with App 1, App 2, and App 3 are illustrated in FIG. 16B as Result Score 1, Result Score 2, and Result Score 3, respectively. Although the entity quality score and the query-entity alignment score may be multiplied by initial scores to generate result scores as illustrated in FIG. 16B, it is contemplated that entity quality scores and query-entity alignment scores could be used to generate result scores in a different manner.

Figure 17:
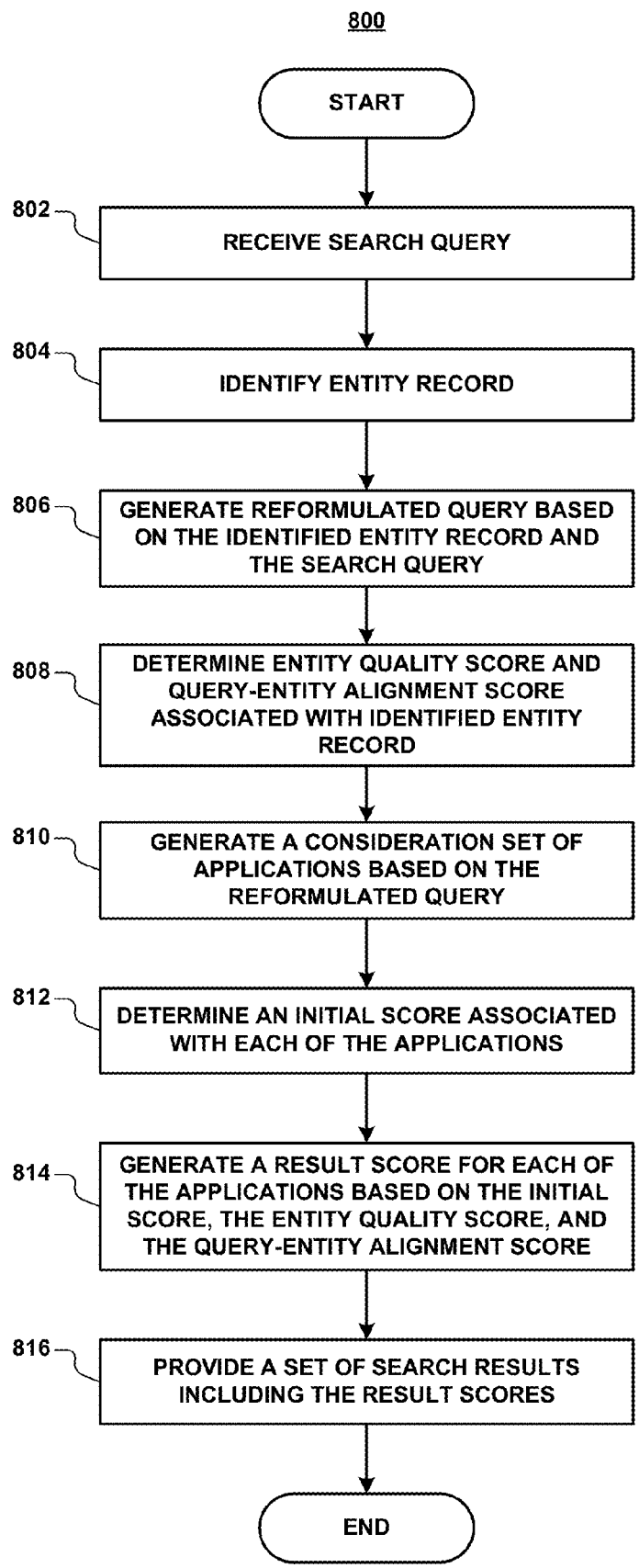
FIG. 17 shows an example method for generating result scores using entity-related values.

FIG. 17 shows an example method 800 for generating result scores using entity-related values. The method 800 is described with reference to the entity identification module 114 and query reformulation module 116 of FIG. 5, and the application search module 232 of FIG. 16B. In block 802, the entity identification module 114 receives a search query 148. The search query 148 may be a search query that was generated by a user device 104.

In block 804, the entity identification module 114 identifies an entity record in the entity data store 112. In block 806, the query reformulation module 116 generates a reformulated query based on the identified entity record and the search query 148. In block 808, the entity identification module 114 determines an entity quality score associated with the identified entity record. The entity identification module 114 may also determine a query-entity alignment score.

In block 810, the query analysis module 122 performs an analysis on the reformulated query and the set generation module 124 generates a consideration set of applications based on the reformulated query. In block 812, the application scoring module 236 generates initial scores for the applications in the consideration set. In block 814, the weighting module 238 generates a result score for each of the applications in the consideration set based on the initial scores, the entity quality score, and the query-entity alignment score. For example, the weighting module 238 may multiply the initial scores by the entity quality score and the query-entity alignment score. In block 816, a set of search results that includes the result scores is provided.

The example method 800 describes generating a single reformulated query for a single identified entity record. Some steps of the example method 800 may be repeated in examples where the entity identification module 114 identifies more than one entity record and/or the query reformulation module 116 generates multiple reformulated queries.

In some implementations, the search system 102 may use the entity-related values in ways other than weighting result scores. For example, the search system 102 may use the entity quality score 230 to reduce the number of searches performed in order to reduce the overall computing resources used to deliver search results to a user. For example, the entity identification module 114 may be configured to discard identified entity records that have low entity quality scores. In one example, the entity identification module 114 may only keep a predetermined number of the entity records having the highest entity quality scores and discard the rest. In other examples, the entity identification module 114 may discard identified entity records having an entity quality score that is less than a threshold value. The query reformulation module 116 may then generate reformulated queries based only on the identified entity records that were not discarded. Similarly, the search system 102 may discard identified entity records if the identified entity records are associated with low query-entity alignment scores. For example, the entity identification module 114 may discard identified entity records associated with a low query-entity alignment score (e.g., less than a threshold value). The query reformulation module 116 may then generate reformulated queries based on those identified entity records that were not discarded.

In some implementations of the search system 102, the entity records may include a list of associated applications along with the entity name, the entity type, and the entity information. FIG. 15B shows an example entity record 240 that includes a list of associated applications 242 along with an entity name 241, an entity ID 243, and entity information 245. The list of associated applications included in an entity record may be different for different entity records. The list of associated applications 242 may be a list of applications that are related to the entity record 240 in some way. In some examples, the list of associated applications 242 may process the entity type 244 as input. For example, if an entity record has a movie entity type, the entity record may include movie playing applications in the list of associated applications. The list of associated applications 242 may also be applications that include, or access, information related to the entity described by the entity record 240. For example, the list of associated applications may include movie database applications when the entity described by the entity record is a movie. In another example, the list of associated applications may include a restaurant locator application when the entity described by the entity record is a type of food (e.g., Mexican food).

FIG. 15C shows an example entity record 246 that is similar to the entity record 164 of FIG. 6C, except that the entity record 246 includes an example list of associated applications 248. The entity record 246 of FIG. 15C describes a comic book with the name "Dark Knight Rises". The list of associated applications 248 includes three applications. Specifically, the list of associated applications 248 includes a first reading application, a second reading application, and a third reading application. The three reading applications in the list of associated applications 248 may be applications that a user could use to preview, download, and/or read the comic book named "Dark Knight Rises".

The list of associated applications 248 may be used as a filter to reduce the total number of applications which are scored by the search system 102. For example, the search system 102 may limit application scoring to those applications listed in the identified entity records. Limiting application scoring to the applications listed in the identified entity records may reduce the computational resources used to provide relevant search results.

FIGS. 18A-18B show an example of the search system 102 generating search results using a list of associated applications in an entity record. FIG. 18A is a diagram that shows how search results may be limited to a list of associated applications. FIG. 18B shows an example application search module 250 that limits the consideration set of applications to a list of associated applications included in an entity record.

In the example of FIG. 18A, as described above with respect to FIG. 9B, the entity identification module 190 identified three different entity records corresponding to the search query "Watch The Dark Knight Rises". Specifically, the entity identification module 190 identified an entity record for a "Movie", a "Comic Book", and a "Soundtrack". The reformulation module 198 generated a reformulated query for each of the identified entity records by replacing terms from the received search query with the entity type of the identified entity records.

Each of the three entity records identified in FIG. 18A may include different lists of associated applications. For example, with respect to the reformulated query "Watch Movie", the list of associated applications (indicated as "Assoc. Apps 1") may be included in the entity record named "Dark Knight Rises" which has an entity type "Movie". With respect to the reformulated query "Watch Comic Book", the list of associated applications (indicated as "Assoc. Apps 2") may be included in the entity record named "Dark Knight Rises" which has an entity type "Comic Book". With respect to the reformulated query "Watch Soundtrack", the list of associated applications (indicated as "Assoc. Apps 3") may be included in the entity record named "Dark Knight Rises" which has an entity type "Soundtrack".

The application search module 250 may perform a search using each of the reformulated queries. The application search module 250 may limit the search results for a reformulated query to the applications listed in the identified entity record associated with the reformulated query. Accordingly, the application search module 250 may limit the generation of result scores to those applications included in the lists of associated applications. As indicated in FIG. 18A, the application search module 250 generates search results for only those applications that are included in the lists of associated applications. With respect to the "Watch Movie" reformulated query, the application search module 250 generates results for the list of Assoc. Apps 1. With respect to the "Watch Comic Book" reformulated query, the application search module 250 generates results for the list of Assoc. Apps 2. With respect to the "Watch Soundtrack" reformulated query, the application search module 250 generates results for the list of Assoc. Apps 3.

FIG. 18B shows an example application search module 250 that generates a set of search results for a reformulated query using a list of associated applications. The application search module 250 receives the search query "Watch Movie" and the list of associated applications referred to as "Assoc. Apps 1", which includes App A, App B, and App C. The query analysis module 122 may analyze the query "Watch Movie", as described above. The set generation module 252 then generates a consideration set of applications. Instead of identifying application records included in the application data store 108, as described above, the set generation module 252 generates a consideration set that includes the list of associated applications App A, App B, and App C. For example, the consideration set may only include the list of associated applications App A, App B, and App C in some examples. The set processing module 126 then generates result scores labeled Result Score 1, Result Score 2, and Result Score 3 for applications App A, App B, and App C, respectively, as described above.

Figure 19:
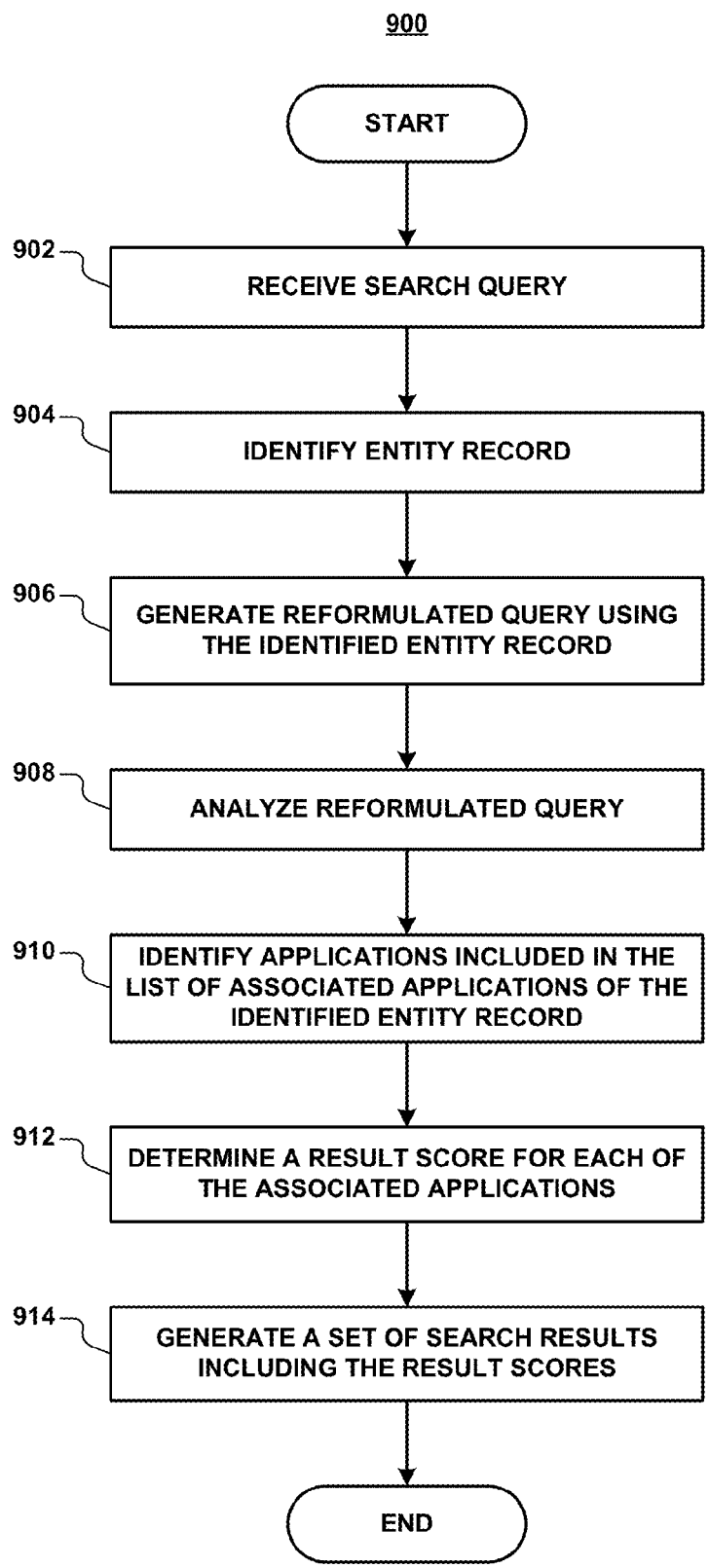
FIG. 19 shows an example method for performing an application search using entity records having a list of associated applications.

FIG. 19 shows an example method 900 for performing an application search using entity records having a list of associated applications. The method 900 is described with reference to the entity identification module 114 and query reformulation module 116 of FIG. 5, and the application search module 250 of FIG. 18B. In block 902, the entity identification module 114 receives a search query 148. The search query 148 may be a search query that was generated by a user device 104.

In block 904, the entity identification module 114 identifies an entity record in the entity data store 112. In block 906, the query reformulation module 116 generates a reformulated query based on the identified entity record and the search query. In block 908, the query analysis module 122 may analyze the reformulated query, as described above.

In block 910, the set generation module 252 identifies the applications included in the list of associated applications of the identified entity record. The set generation module 252 generates a consideration set that includes the identified applications. For example, the consideration set may include only the identified applications in some examples. In block 912, the set processing module 126 determines a result score for each of the identified applications. In block 914, the set processing module 126 generates a set of search results including the list of identified applications and the associated result scores.

The example method 900 describes generating a single set of search results based on a single reformulated query. Some steps of the example method 900 may be repeated in examples where the entity identification module 114 identifies more than one entity record and/or the query reformulation module 116 generates multiple reformulated queries.

As described herein, the search system 102 may discard identified entity records using filtering techniques in order to reduce the overall computing resources used to perform a search. In some examples, the search system 102 (e.g., the entity identification module 114) may discard identified entity records that have entity names which are substrings of the entity names of other identified entity records. For example, if a search query 148 includes the entity name "Dark Knight Rises" and the entity identification module 114 identifies entity records for "Dark Knight Rises" and "Dark Knight", the entity identification module 114 may discard the entity record for "Dark Knight". In this example, the entity record for "Dark Knight Rises" may be more relevant to the search query than the entity record for "Dark Knight" because the entire name "Dark Knight Rises" is included in the search query. Accordingly, in some examples, discarding identified entity records that have entity names which are substrings of the entity names of other identified entity records may yield relevant search results while also reducing the overall computing resources used to perform a search.

Modules and data stores included in the search system 102 represent features that may be included in the search system 102 of the present disclosure. For example, the entity identification module 114, the query reformulation module 116, the application search module 110, the application data store 108, and the entity data store 112 may represent features included in the search system 102. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. For example, the memory components may include the application data (e.g., application records) included in the application data store 108 and the entity data (e.g., entity records) included in the entity data store 112. Memory components may also include instructions that may be executed by one or more processing units. For example, memory may include computer-readable instructions that, when executed by one or more processing units, cause the one or more processing units to perform the various functions attributed to the modules and data stores described herein.

The I/O components may refer to electronic hardware and software that provides communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In some examples, the I/O components may include hardware and software that is configured to communicate with additional devices, such as external memory (e.g., external HDDs).

In some implementations, the search system 102 may be a system of one or more computing devices (e.g., a computer search system) that are configured to implement the techniques described herein. Put another way, the features attributed to the modules and data stores described herein may be implemented by one or more computing devices. Accordingly, one or more computing devices may receive a search query 148 from a user device and identify one or more entity records in an entity data store 112 based on the received search query 148. The one or more computing devices may then generate one or more reformulated queries by inserting one or more terms from the identified entity records into the received search query. The one or more computing devices may then perform a search for software applications using the one or more reformulated queries and generate a list of software applications identified during the search.

Each of the one or more computing devices may include any combination of electronic hardware, software, and/or firmware described above. For example, each of the one or more computing devices may include any combination of processing units, memory components, I/O components, and interconnect components described above. The one or more computing devices of the search system 102 may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the search system 102 may be configured to communicate with the network 106. The one or more computing devices of the search system 102 may also be configured to communicate with one another via a computer network. In some examples, the one or more computing devices of the search system 102 may include one or more server computing devices configured to communicate with user devices (e.g., receive queries and transmit results), gather data from data sources 120, index data, store the application data and the entity data, and store other documents. The one or more computing devices may reside within a single machine at a single geographic location in some examples. In other examples, the one or more computing devices may reside within multiple machines at a single geographic location. In still other examples, the one or more computing devices of the search system 102 may be distributed across a number of geographic locations.

What is claimed is:

1. A method comprising:
    receiving, by a computer search system, a first search query from a user device;
    identifying, by the computer search system and using the first search query, one entity record matching at least a portion of the first search query;
    retrieving from the one entity record, by the computer search system, a first list of software applications that are associated with the one entity record;
    retrieving from the one entity record, by the computer search system, an entity type indicating a category;
    generating, by the computer search system, a second search query including the entity type identified using the first search query;
    performing, by the computer search system, a search using the second search query for software applications that match the entity type;
    generating a second list of software applications limited to ones of the software applications that both (i) were identified during the search and (ii) are included on the first list of software applications retrieved from the one entity record; and
    transmitting, by the computer search system, to the user device, the second list of software applications.

2. The method of claim 1 wherein receiving the first search query from the user device includes receiving the first search query from the user device during execution of an application by the user device.

3. The method of claim 1 further comprising displaying, by the user device, the second list of software applications on a display of the user device.

4. The method of claim 1 wherein generating the second search query includes generating the second search query by replacing one or more terms in the first search query with one or more other terms including the entity type.

5. The method of claim 1 further comprising:
    generating a result score for each of the software applications in the list of software applications based on matches between one or more terms included in the one entity record and a second one or more terms included in the first search query; and
    ranking the software applications in the list of software applications based on the result scores associated with the software applications.

6. A search system comprising:
    a data store that includes a plurality of entity records, wherein each entity record of the plurality of entity records includes a first list of software applications that are associated with the entity record; and
    one or more computing devices configured to:
        receive a first search query from a user device;
        identify, using the first search query, one entity record of the plurality of entity records matching at least a portion of the first search query;
        retrieve, from the one entity record, the first list of software applications that are associated with the one entity record;
        retrieve, from the one entity record, an entity type indicating a category;
        generate a second search query including the entity type identified using the first search query;
        perform a search, using the second search query, for software applications that match the entity type;
        generating a second list of software applications limited to ones of the software applications that both (i) were identified during the search and (ii) are included on the first list of software applications retrieved from the one entity record; and
        transmit, to the user device, the second list of software applications associated with the one entity record and retrieved from the one entity record.

7. The search system of claim 6 wherein the one or more computing devices receive the first search query from the user device during execution of an application by the user device.

8. A system comprising:
    the search system of claim 6; and
    the user device, the user device including a display, and the user device being configured to display the second list of software applications on the display of the user device.

9. The search system of claim 6 wherein the one or more computing devices is configured to generate the second search query by replacing one or more terms in the first search query with one or more other terms including the entity type.

10. The search system of claim 6 wherein the one or more computing devices is further configured to:
    generate a result score for each of the software applications in the list of software applications based on matches between a first one or more terms included in the one entity record and a second one or more terms included in the first search query; and
    rank the software applications in the list of software applications based on the result scores associated with the software applications.

11. A non-transitory computer-readable storage medium comprising instructions that cause one or more computing devices to:
    receive a first search query from a user device;
    identify, from a data store and using the first search query, one entity record of a plurality of entity records in the data store,
    wherein each entity record of the plurality of entity records includes a first list of software applications that are associated with the entity record;
    retrieve, from the one entity record, the first list of software applications that are associated with the one entity record;
    retrieve, from the one entity record, an entity type indicating a category;
    generate a second search query including the entity type identified using the first search query;
    perform a search using the second search query for software applications that match the entity type;
    generate a second list of software applications limited to ones of the software applications that both (i) were identified during the search and (ii) are included on the first list of software applications retrieved from the one entity record; and transmit, to the user device, the second list of software applications associated with the one entity record and retrieved from the one entity record.

12. The non-transitory computer-readable storage medium of claim 11 wherein the instructions cause the one or more computing devices to receive the first search query from the user device during execution of an application by the user device.

13. The non-transitory computer-readable storage medium of claim 11, wherein the instructions cause the one or more computing devices to generate the second search query by replacing one or more terms in the first search query with one or more other terms.

14. A method comprising:
receiving, by a computer search system, a first search query from a user device;
identifying, by the computer search system and using the first search query, one entity record matching at least a portion of the first search query;
retrieving from the one entity record, by the computer search system, one or more general terms associated with the one entity record;
generating, by the computer search system based on the first search query, a second search query:
that includes a first one or more terms included in the first search query;
that does not include a second one or more terms included in the first search query; and
that includes the one or more general terms, the one or more general terms being more general than the second one or more terms;
performing, by the computer search system, a search for software applications using the second search query;
generating a list of software applications identified during the search; and
transmitting, by the computer search system, to the user device, the list of software applications.

* * * * *